United States Patent [19]

Norizuki et al.

[11] Patent Number: 5,570,361
[45] Date of Patent: Oct. 29, 1996

[54] APPARATUS AND A METHOD FOR SUPERVISING AND CONTROLLING ATM TRAFFIC

[75] Inventors: Reiko Norizuki; Ryuji Hyodo; Kenji Tanaka; Osamu Sekihata; Hiroyuki Hatta; Susumu Eda; Katsumi Oomuro, all of Kawasaki, Japan

[73] Assignee: Fujitsu Limited, Kawasaki, Japan

[21] Appl. No.: 272,378

[22] Filed: Jul. 6, 1994

Related U.S. Application Data

[62] Division of Ser. No. 19,835, Feb. 19, 1993, Pat. No. 5,357,510.

[30] Foreign Application Priority Data

Feb. 19, 1992 [JP] Japan ................................. 4-031864
Mar. 19, 1992 [JP] Japan ................................. 4-063339
May 18, 1992 [JP] Japan ................................. 4-124622

[51] Int. Cl.[6] ................................................. H04L 12/56
[52] U.S. Cl. ........................................ 370/60.1; 370/111
[58] Field of Search ........................ 370/60, 60.1, 94.1, 370/94.2, 111

[56] References Cited

U.S. PATENT DOCUMENTS

| | | | |
|---|---|---|---|
| 4,646,287 | 2/1987 | Larson et al. ............................. | 370/60 |
| 5,119,369 | 6/1992 | Tanabe et al. ............................ | 370/60 |
| 5,144,619 | 9/1992 | Munter ..................................... | 370/60.1 |
| 5,184,346 | 2/1993 | Kozaki et al. ............................ | 370/60 |
| 5,278,827 | 1/1994 | Pound ....................................... | 370/84 |
| 5,280,476 | 1/1994 | Kojima et al. ........................... | 370/60.1 |
| 5,285,441 | 2/1994 | Bansal et al. ............................ | 370/16 |
| 5,339,317 | 8/1994 | Tanaka et al. ........................... | 370/94.1 |
| 5,359,600 | 10/1994 | Ueda et al. .............................. | 370/60.1 |
| 5,373,504 | 12/1994 | Tanaka et al. ........................... | 370/60.1 |

Primary Examiner—Wellington Chin
Assistant Examiner—Min Jung
Attorney, Agent, or Firm—Staas & Halsey

[57] ABSTRACT

A method for supervising and controlling ATM traffic, which uses idle cells transferring traffic information to manage a network, comprising steps of a first step for mapping traffic information in the information field of an idle cell and transferring said idle cell to other communication nodes, a second step for performing the operation of traffic control in accordance with the contents of said traffic information included in said idle cell on the receiving side of said other communication nodes, and a third step for assembling a new idle cell including said traffic information of received idle cell and/or new traffic information on said receiving side of communication nodes and transferring said new idle cell from said receiving side of communication nodes to other communication nodes.

6 Claims, 30 Drawing Sheets

Fig.4

| BIT | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | 1 |
| 0 | 0 | 0 | 0 | 0 | 0 | 0 | 0 | 2 |
| 0 | 0 | 0 | 0 | 0 | 0 | 0 | 0 | 3 |
| 0 | 0 | 0 | 0 | 0 | 0 | 0 | 1 | 4 |
| HEC | | | | | | | | 5 |

OCTET

Fig.5

| BIT | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 0 | 1 |
| 0 | 0 | 0 | 0 | 0 | 0 | 0 | 0 | 2 |
| 0 | 0 | 0 | 0 | 0 | 0 | 0 | 0 | 3 |
| 0 | 0 | 0 | 0 | 1 | 1 | 0 | 1 | 4 |
| HEC | | | | | | | | 5 |

OCTET

Fig. 31

| Octet | Field |
|---|---|
| OCTET 5 / OCTET 6 | SOURCE NODE ID |
| OCTET 7 / OCTET 8 | DESTINATION NODE ID |
| OCTET 9 / OCTET 10 | CORRESPONDENT VPI |
| OCTET 11 / OCTET 12 | CORRESPONDENT VCI |
| OCTET 13 / OCTET 14 | PHENOMENON CODE |
| OCTET 15 / OCTET 16 | ADAPTATION CODE |

APPARATUS AND A METHOD FOR SUPERVISING AND CONTROLLING ATM TRAFFIC

This application is a division of application Ser. No. 08/019,835, filed Feb. 19, 1993, which has been allowed, now U.S. Pat. No. 5,357,510.

BACKGROUND OF THE INVENTION (1) Field of the Invention

The present invention relates to traffic control between communication nodes in ATM (Asynchronous Transfer Mode) communication, and more particularly to an apparatus and a method for ATM traffic supervisory control wherein an idle cell or an administrative cell is used for the traffic control.

ATM is a specific packet oriented transfer mode using an asynchronous time division multiplexing technique. The multiplexed information flow is organized in fixed size blocks, called cells (ATM cell). An ATM cell consists of an information field and a header. The primary role of the header is to identify cells belonging to the same virtual path and virtual channel (VP/VC) connection. Cells are assigned on demand, depending on the source activity and the available resources. Cell sequence integrity on a virtual channel connection is preserved by the ATM Layer.

(2) Description of the Prior Art

In recent years, B-ISDN (Broadband-Integrated Service Digital Network) has appeared on public switched telephone networks as the next stage of the network. The B-ISDN realizes an even more flexible broadband communication network that makes various services including, e.g., voice communication, data communication, very high speed file transfer, communication between local area networks (LAN), and HDTV (high definition television) services, etc., possible, and therefore uses ATM technology described above that is applicable to multi-mediam communication services.

FIG. 1 schematically shows an example of a configuration between communication nodes in a B-ISDN network. In FIG. 1, a subscriber terminal (TE; terminal equipment) 11 is connected to a communication node 12 in accordance with a user network interface (UNI). A DSU (Digital Service ,Unit) 15 is used to send or receive an ATM cell described above between communication nodes 12 in accordance with a node network interface (NNI). An internal structure of each communication node 12 consists of, e.g., ATM adaptation layer (AAL) 13, ATM switch (ATM-SW) 14 and control unit therefor, etc. The AAL 13 performs segmentation of higher layer information into a size suitable for the information field of an ATM cell and reassembly of the contents of an ATM cell information field into higher layer information between the subscriber terminal 11 and the ATM switch 14.

FIG. 2 shows a basic cell structure of an ATM cell. The ATM cell consists of a five octet header containing information of, e.g., a destination path and channel, etc., and a 48-octet information field containing various information, e.g., voice or data, which is segmented by every 48-bytes, and sent from a terminal 11 shown in FIG. 1. FIG. 3 shows a structure of the header in which coding schemes are adopted according to the network node interface (NNI). In FIG. 3, the first twenty-eight bits are available for routing; 12 bits for a virtual path identifier (VPI) and 16 bits for a virtual channel identifier (VCI). The VPI indicates a communication path and the VCI indicates a channel used in the indicated communication path. A payload type (PT) field (3 bits) indicates a type of information written in the information field. A cell loss priority (CLP) field (1 bit) is used for congestion control, and if the CLP is set (CLP value is 1), the cells are subject to being discarded, depending on network conditions. If the cell is not set (CLP value is 0), the cell has a higher priority. A header error control (HEC) field covers the entire cell header and the code used for this function, that is a CRC (Cyclic Redundancy Check) code, is capable of either single-bit error collection or multiple bit error detection.

FIG. 4 and 5 show examples of the header structure of an ATM cell. The former is the header of an idle cell used to delineate a boundary between adjacent cells, that is a so-called "HEC delineation". The idle cell has specific header values, i.e., VPI/VCI bits and PT bits are all zero, and only a CLP bit is 1 as shown in FIG. 4, and also the HEC bit pattern of the idle cell is fixed at "01010010" as the result of CRC calculation. The HEC delineation described above is performed by detecting the fixed pattern of the HEC field of an idle cell. The latter is the header of an administrative cell. The administrative cell is identified by the value of PT bits "110" as shown in FIG. 5, and used for management of resources.

Again, in FIG. 1, data, which is segmented by the AAL 13, sent from a terminal 11, is applied to a communication path set up by an ATM switch 14. The ATM switch 14 performs high speed ATM switching operation using data (VPI/VCI) of the cell header. However, when detecting the condition of congestion caused by, e.g., an excess of input data over channel capacity, etc., during data transfer, the ATM switch 14 discards partial data from the terminal 11, depending on the path conditions. In such a case, the ATM switch 14 checks the ClP bit of a cell header, and the cell of which the ClP bit is 1 is discarded prior to the cell of which the CLP bit is 0. Usually, the CLP bit of such a voice cell that has a large amount of redundancy and little influence on the cell discard described above is set (CLP value is 1), and conversely the CLP bit of a data cell is not set (CLP value is 0). FIG. 1 illustrates that terminals 11 of both sides combined with respective communication nodes 12 are connected to each other through VP 16 and VC 17.

As described above, in ATM communication the cell discard described above is caused by the condition of congestion. This is very different from conventional STM (Synchronous Transfer Mode) communication in which predetermined data is transferred in a fixedly assigned time-slot so the data discard as described above is never caused. Therefore, in the conventional STM communication there is no need to collect traffic information. Conversely, in the ATM communication there is need to collect traffic information for traffic control so as to manage and keep a network in good condition.

However, in a prior art, a conventional traffic supervisory control apparatus continuously or statistically measures the number of incoming valid information cells and uses the measured cell count as traffic control information (refer to Japanese Unexamined Patent Publication No. 2-272939). In that way, there is a problem that it cannot detect a burst traffic condition that is caused by a concentration of cells incoming or outgoing for a short time, though ATM basically has the character of burst data transmission. Also, in the case of constructing a new network or extending an existent network, it is necessary to set several system parameters for traffic control of the new or existent network, depending the network conditions. However, in such a case there is a problem that it is very difficult to set the parameters described above, particularly to set the most suitable threshold value for starting the operation of the traffic control, and therefore enormous simulation of traffic in the network described above is required in order to precisely decide the parameters.

Further, since cell discard as described above is caused in the ATM communication, it is necessary to conveniently exchange communication paths when the condition of congestion is caused or expected by ordinal monitoring of the paths. In this case, conventionally, each communication node described above sends traffic information thereon together with a network control signal to a network management unit for performing the network management through a so-called control path. However, the traffic information, e.g., the number of cells sent and received for a unit-time, etc., increases in proportion to an increase in the number and so the rate of circuit capacity occupied by the traffic information increases, so that the rate of circuit capacity available to the network control signal decreases, and thereby there is caused a problem that enough circuit capacity for transferring the network control signal to perform the real-time network control cannot be secured. This problem is significant-in that the centralized control over total networks becomes difficult, in particular that for a network in a congested condition, which needs the real-time control most of all.

Furthermore, in a prior art ATM cells having a specific value of VPI/VCI are used as a transmission medium of network control information and network supervisory information. Thus, the cells are easily influenced by an ATM switch unit, and therefore there is a problem that the cell transmission is delayed by fluctuation of ATM switches and a queuing of the cells at the ATM switch unit.

SUMMARY OF THE INVENTION

The purpose of the present invention is to provide an apparatus and a method for traffic supervisory control that ordinarily monitors the band capacity of a transmission-line, and thereby, obtains information of brief traffic fluctuations in real time, and in accordance with the information performs the real-time traffic control to also be able to cope with burst conditions of the traffic fluctuation.

Further, the purpose of the present invention is to provide an apparatus and a method for traffic supervisory control that uses an administrative cell to transfer traffic information. The administrative cell is transferred on general communication paths except for a control path, and thereby the centralized control of, e.g., collection of the traffic information and congestion control, etc., can be realized without increasing the number of control paths.

Furthermore, the purpose of the present invention is to provide an apparatus and a method for traffic supervisory control that uses an information field of an idle cell in which traffic information is mapped to generate a traffic information cell to transfer traffic information, and thereby the cell having the traffic information can be prevented from causing the transmission delay as described above.

According to the present invention an apparatus for supervising and controlling ATM traffic, which collects traffic information, comprises cell detecting means for outputting a cell detecting signal whenever a user information cell flowing through ATM switch unit is detected, idle cell detecting means for outputting an idle cell detecting signal whenever an idle cell flowing through ATM switch unit is detected, cell counting means for counting the cell detecting signal output from the cell detecting means, idle cell counting means for counting the idle cell detecting signal output from the idle cell detecting means, idle cell rate detecting means for detecting an idle cell rate from both counts output from the cell counting means and the idle cell counting means at regular intervals, and control means for performing the operation of traffic control in accordance with the idle cell rate provided from the idle cell rate detecting means at regular intervals.

The idle cell rate detected in the idle cell rate detecting means is obtained by calculating an equation $M/(N+M)$ wherein N is a cell count for the regular interval provided from the cell counting means and M is an idle cell count for the regular interval provided from the idle cell counting means.

According to the present invention, the apparatus for supervising and controlling ATM traffic, which collects traffic information, comprises cell detecting means and idle cell detecting means described above, traffic counting means for counting the cell detecting signal output from the cell detecting means and being cleared by the idle cell detecting signal output from the idle cell detecting means, notification means for notifying control means of the count of the traffic counting means before being cleared, and control means for performing the operation of traffic control in accordance with the count value provided from the notification means.

Further, according to the present invention, an apparatus for supervising and controlling ATM traffic, which uses administrative cells transferring traffic information to manage a network, comprises timer means for outputting a timing signal to transfer the administrative cells at regular intervals, cell assembling means for assembling transmit cells from transmit data and interrupting output of the transmit cells by the timing signal from the timer means, cell disassembling means for disassembling received cells into received data, traffic information holding means for holding traffic information from the cell assembling means and the cell disassembling means, administrative cell assembling means for assembling the administrative cells having the traffic information from the traffic information holding means by the timing signal from the timer means, and selecting means for exchanging output cells from the transmit cells from the cell assembling means to the administrative cells from the administrative cell assembling means by the timing signal from the timer means.

The apparatus for supervising and controlling ATM traffic, which uses administrative cells transferring traffic information to manage a network, described above can use, instead of the timer means described above, administrative information detecting means for detecting a transmit request of the administrative cells from received cells, or transmit cell count detecting means for outputting a detection signal when a transmit cell count is up to a predetermined number at regular intervals.

Furthermore, according to the present invention, a method for supervising and controlling ATM traffic comprises a step of using an idle cell having traffic information, which is mapped, on the information field of the idle cell, to transfer traffic information to other communication nodes.

Also, the method for supervising and controlling ATM traffic, which uses idle cells transferring traffic information to manage a network, comprises a first step for mapping traffic information in the information field of an idle cell and transferring the idle cell to other communication nodes, a second step for performing the operation of traffic control in accordance with the contents of the traffic information including in the idle cell on the receiving side of other communication nodes, and a third step for assembling a new idle cell including the traffic information of a received idle cell and/or new traffic information on the receiving side of other communication nodes and transferring the new idle cell from the receiving side of a communication node to other communication nodes.

BRIEF DESCRIPTION OF THE DRAWINGS

The present invention will be more clearly understood from the description as set forth below with reference to the accompanying drawings.

FIG. 4 is the header structure of an idle cell.

FIG. 5 is the header structure of an administrative cell.

FIG. 31 is an example of a payload mapping of an idle cell.

DESCRIPTION OF THE PREFERRED EMBODIMENTS

Figure 6:
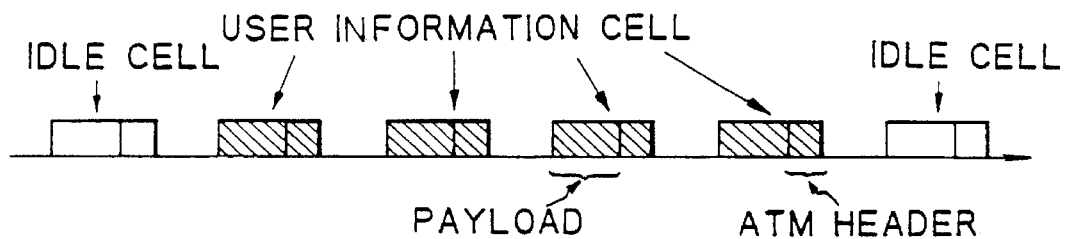
FIG. 6 is an example of arrangement of cells on a transmission-line.
Figure 7:
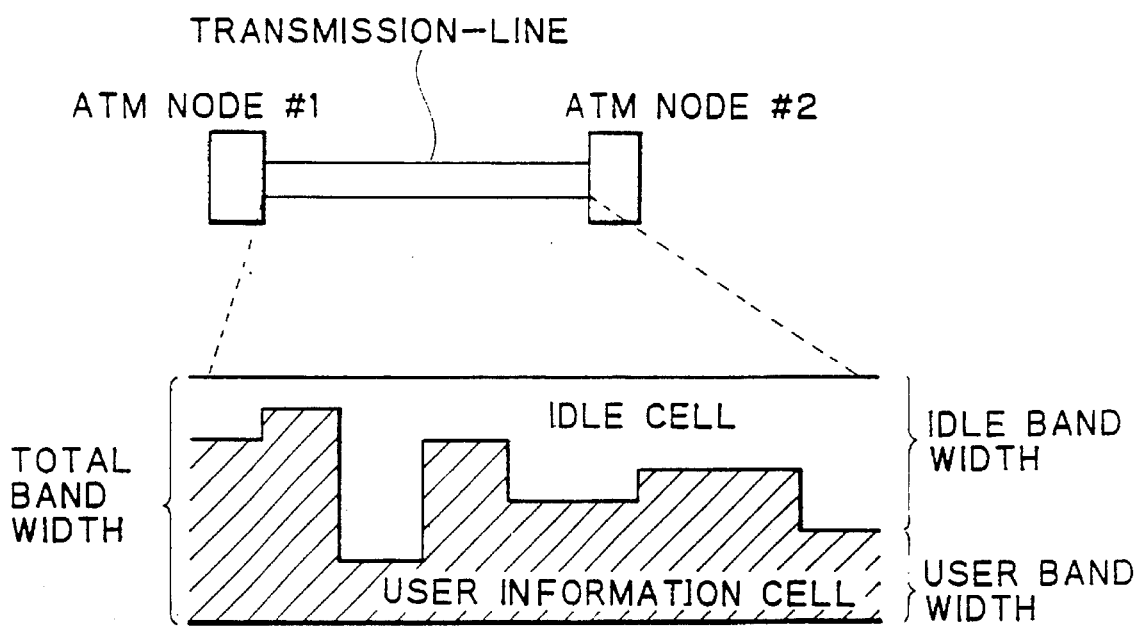
FIG. 7 is an example of the condition of fluctuation of the ratio of an idle cell to a user information cell on a transmission-line between the ATM node #1 and the ATM node #2.

FIG. 6 and FIG. 7 are explanatory views of logical multiplexing of cells on a transmission-line. FIG. 6 shows an example of an arrangement of cells on a transmission-line. As shown in FIG. 6, idle cells are inserted into time-positions wherein user information cells are not in existence on a transmission-line. FIG. 7 shows an example of a variation of the ratio of idle cells to user information cells on a transmission-line between an ATM node #1 and an ATM node #2, and a total band width consists of an idle cell band width and a user band width. The user information cell uses an available band width and the other band width is inserted by the idle cell. The idle cell is used for HEC (Header Error Control) delineation between network nodes.

Figure 1:
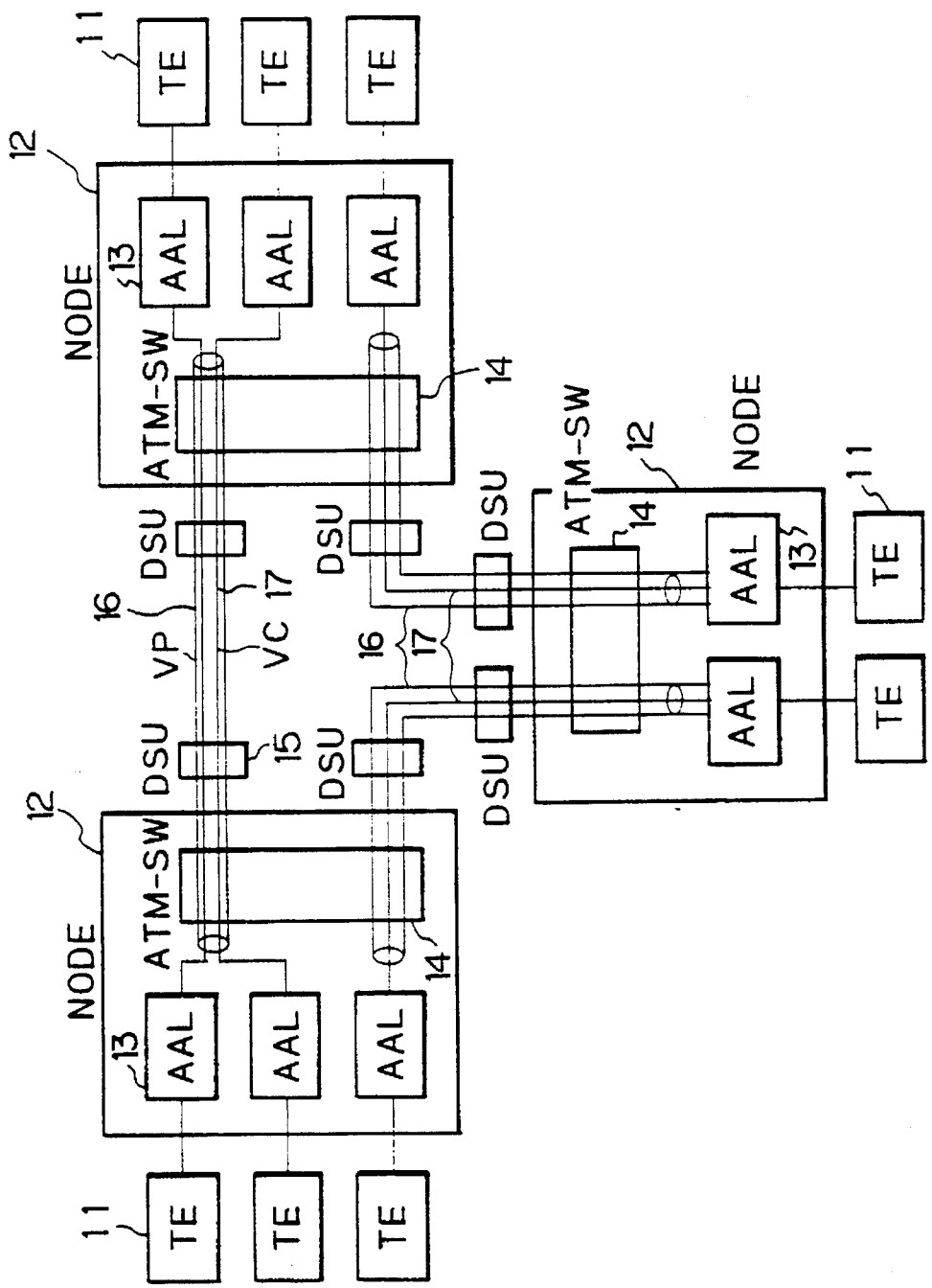
FIG. 1 is an example of a B-ISDN network configuration.
Figure 2:
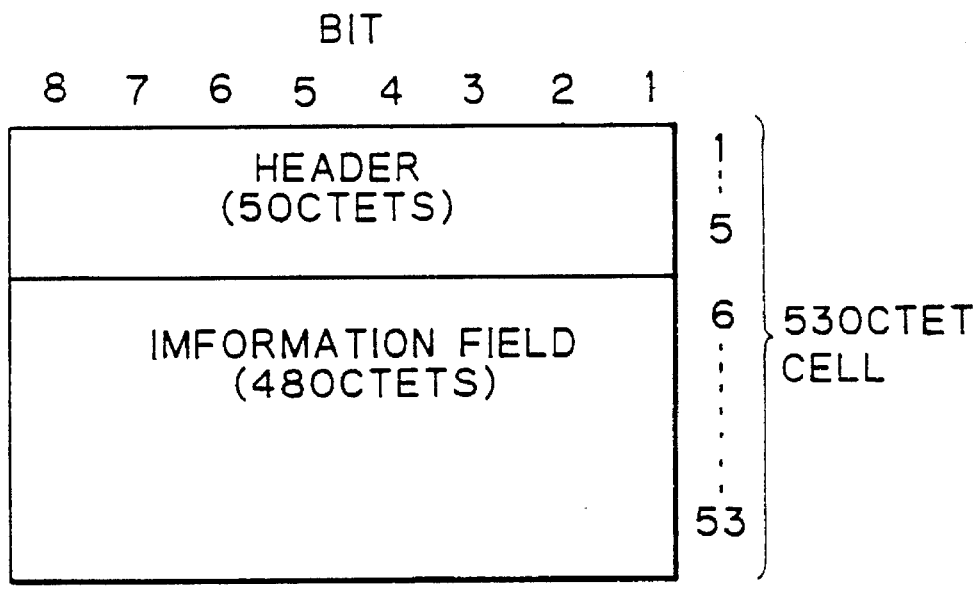
FIG. 2 is a basic cell structure of an ATM cell.

As explained in FIG. 2, both a user information cell and an idle cell consists of 53 bytes (octet) and the front position of 5 bytes are an ATM header and the other 48 bytes are an information field. A distinction between an idle cell and a user information cell is indicated by the content of the ATM header. As shown in FIG. 4, the ATM header of the idle cell is "all zero" except that the last bit of the fourth byte from the head of the ATM header is "1" and 8 bits of the fifth byte is provided with the HEC corresponding to those bit assigned, and in contrast to this, to the user information cell various kinds of control information, i.e., VPI/VCI and PT, etc., and HEC are assigned at the header field. Therefore, the idle cell can be distinguished from the user information cell by the difference in each structure of the ATM header, as described above.

Figure 8:
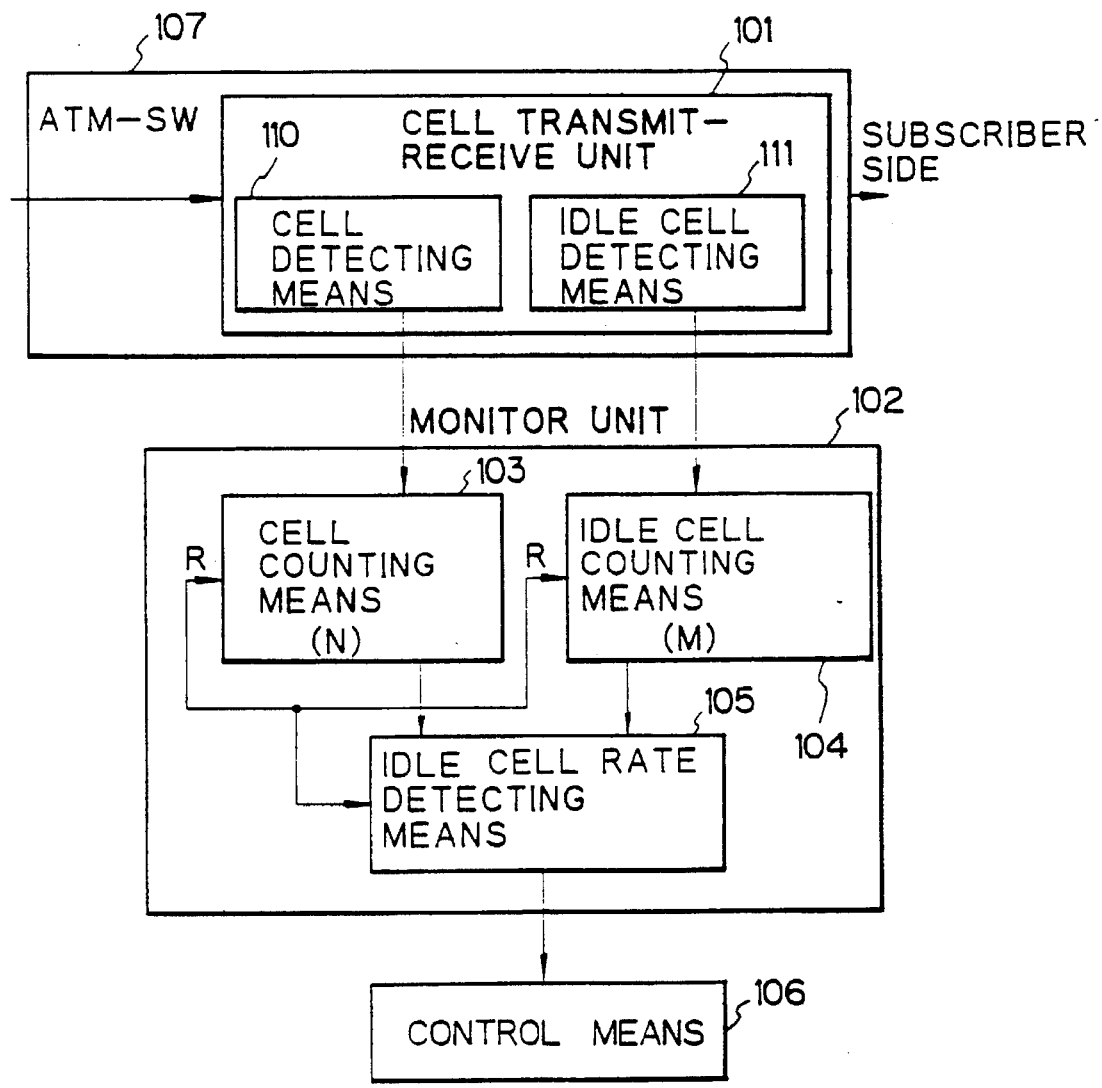
FIG. 8 is a block diagram showing a first constitution of the present invention.
Figure 9:
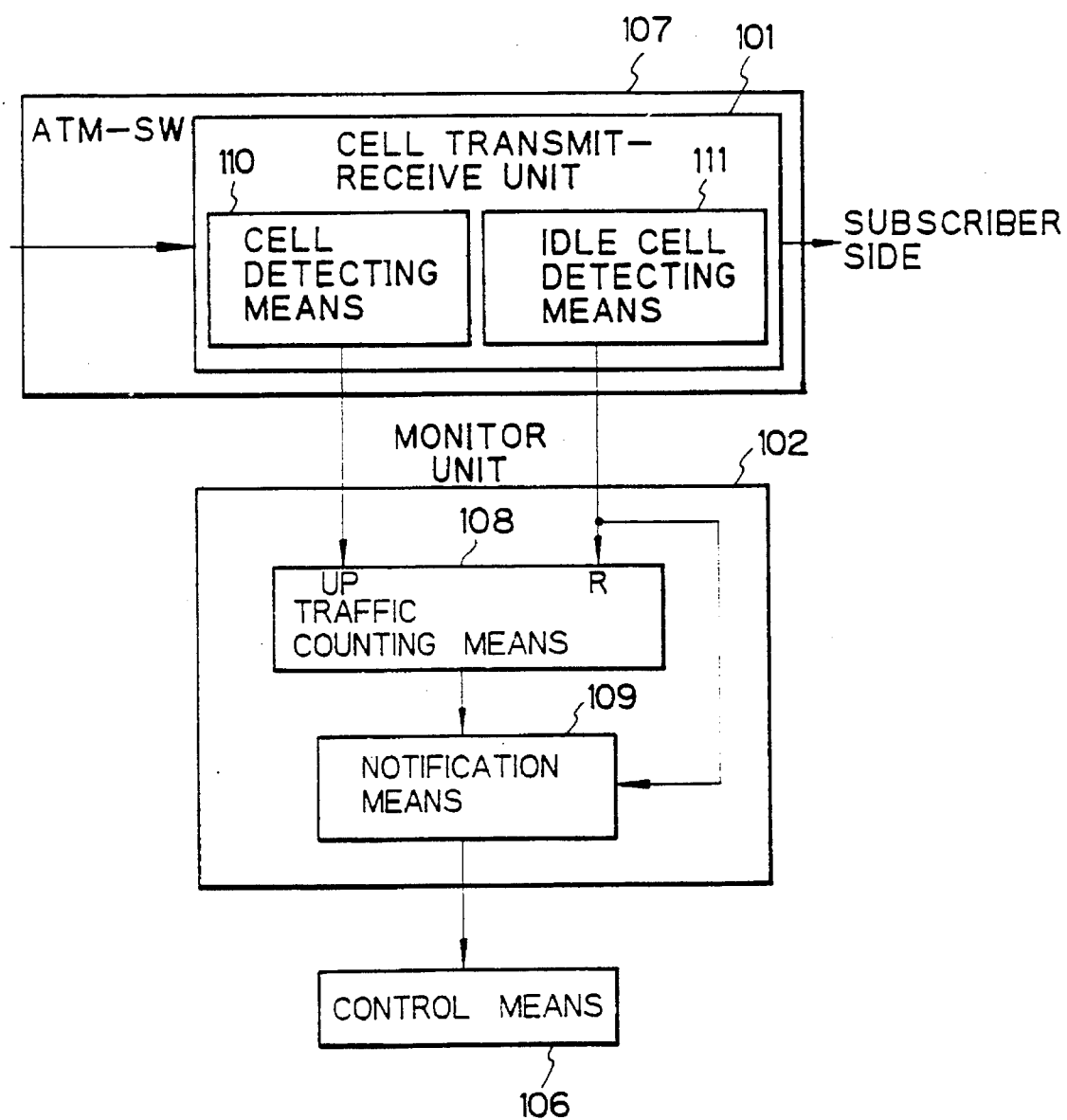
FIG. 9 is a block diagram showing a second constitution of the present invention.

FIG. 8 shows a first preferred embodiment schematically illustrating the first basic constitution of the present invention, and FIG. 9 shows a second preferred embodiment schematically illustrating the second basic constitution of the present invention.

In FIG. 8, reference numeral 101 is a cell transmit-receive unit, reference numeral 102 is a monitor unit, reference numeral 106 is a control unit and reference numeral 107 is a ATM switch unit. Reference numeral 103 is a cell counting means; reference numeral 104 is an idle cell counting means; reference numeral 105 is an idle cell rate detecting means, and also in the cell transmit-receive unit 101, reference numeral 110 is a cell detecting means for detecting a user information cell and reference numeral 111 is an idle cell detecting means for detecting an idle cell. In FIG. 9, reference numeral 108 is traffic counting means; reference numeral 109 is a notification means and the other is the same as described above.

In FIG. 8, traffic is controlled by detecting the idle cell rate transferring inside the ATM switch unit 107 since the ATM switch unit 107 inserts an idle cell into a transmission-line when there is no user information cell on the transmission-line so as to keep the cell boundaries clear between a user information cell and an idle cell. In FIG. 9, a series of user information cells between each idle cell are counted so as to detect a burst transmission that may unexpectedly cause short time traffic congestion.

In FIG. 8, a cell is transmitted between the cell transmit-receive unit 101 and a subscriber side and also between the cell transmit-receive unit 101 and an ATM switch side. Whenever the cell detecting means 110 detects a user information cell or the idle cell detecting means 111 detects an idle cell, the cell detecting means 110 outputs a cell detecting signal and the idle cell detecting means 111 outputs an idle cell detecting signal.

The cell counting means 103 in a monitor unit 102 counts up the cell detecting signal and the idle cell counting means 104 counts up the idle cell detecting signal. Counting values from the cell counting means 103 and the idle cell counting means 104 are provided to the idle cell rate detecting means 105 at intervals of one unit time. The idle cell rate detecting means 105 calculates M/(N+M), where N is a counting value of the cell counting means 103, and M is a counting value of the idle cell counting means 104. Calculating M/(N+M) corresponds to the detection of an idle cell rate (speed).

The detected idle cell rate is provided to a control means 106. If the idle cell rate is lower than a predetermined rate, the control means 106 performs traffic control, which interrupts cell input or discards a cell on an ATM switch unit 107, depending on network conditions. Conversely, if higher than the predetermined rate, the idle cell rate stops the traffic control. The cell counting means 103 and the idle cell counting means 104 are reset when providing each counting value to the idle cell rate detecting means 105 at intervals of the unit time.

In FIG. 9, a cell detecting means 110 outputs a cell detecting signal and idle cell detecting means 111 outputs an idle cell detecting signal as described above in FIG. 8. The cell detecting signal is provided to a count up terminal (UP) of traffic counting means 108 in a monitor unit 102, and also the idle cell detecting signal is provided to a reset terminal (R) of the traffic counting means 108 and notification means 109. The cell detecting signal counts up the traffic counting means 108. The idle cell detecting signal causes the notification means 109 to provide a counting value of the traffic counting means 108 at that time to a control means 106 and thereafter resets the traffic counting means 108. Therefore, in this embodiment, traffic control is performed in accordance with the counting value of the traffic counting means 108, which indicates the burst transmission of a series of user information cells between each idle cell, depending on network conditions.

Figure 10:
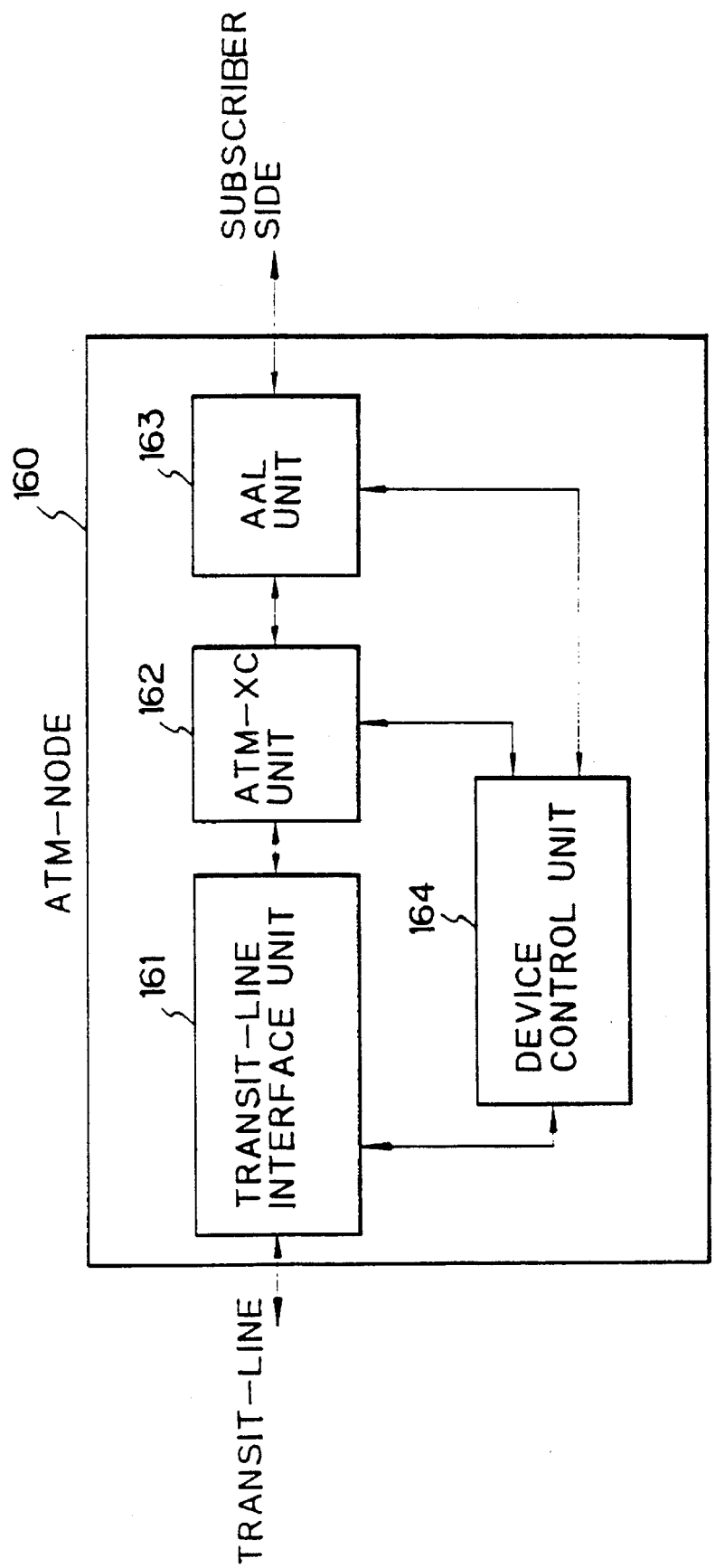
FIG. 10 is a block diagram of the ATM node according to the present invention shown in FIG. 8 and 9.
Figure 11:
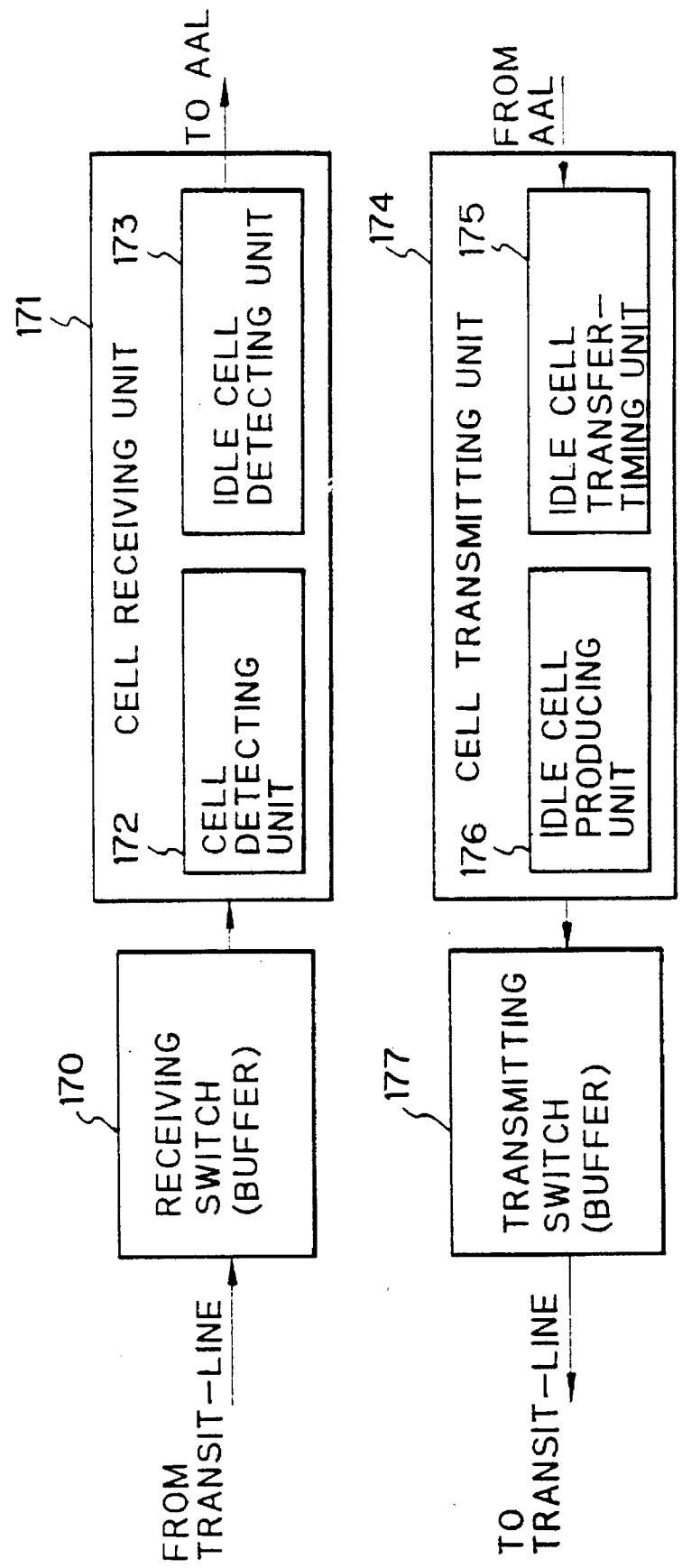
FIG. 11 is a block diagram showing the internal constitution of the ATM cross connect unit shown in FIG. 10.

FIG. 10 is a block diagram of an ATM node according to the present invention and FIG. 11 is a block diagram of an ATM cross-connect unit in FIG. 10. In FIG. 10, reference numeral 160 is an ATM node (exchange), reference numeral 161 is a transit-line interface unit for interfacing with a transit-line to connect other ATM nodes, reference numeral 162 is an ATM cross connect (ATM-XC) unit for switching an ATM cell; reference numeral 163 is an ATM adaptation layer (AAL) unit for performing an adaptation layer process of an ATM cell, and reference numeral 164 is a device control unit for controlling traffic and each unit described above in the node 160. The transit-line interface unit 161, the ATM-XC unit 162 and the AAL unit 163 has a structure of two-way transmission.

FIG. 11 is a block diagram showing an inside constitution of an ATM cross connect unit 162 shown in FIG. 10. In FIG. 11, units 170–173 are arranged on the receiving side and they receive a cell from a transit-line interface unit 161, and after switching the cell, they send the cell to an AAL unit 163. Reference numeral 170 is a receiving switch including a buffer, and reference numeral 171 is a cell receiving unit including a cell monitoring part according to the present invention. The cell receiving unit 171 has a cell detecting unit 172 for detecting a user information cell and an idle cell detecting unit 173 for detecting an idle cell.

Also, in FIG. 11 units 174–177 are arranged on the transmitting side and they receive a cell from an AAL unit 163, and after switching the cell, they send the cell to a transit-line interface unit 161. Reference numeral 174 is a cell transmitting unit for sending a cell input from the AAL unit 163, and reference numeral 177 is a transmitting switch including a buffer, and the cell transmitting unit 174 has an idle cell transfer-timing unit 175 and an idle cell producing unit 176 for sending an idle cell in addition to transmitting a user information cell.

As shown in FIG. 11, the cell transmitting unit 174 receives a user information cell sent from the AAL unit 163 and sends the cell to the transmitting switch 177. When the user information cell sent from the AAL unit 163 does not use all of a total band width of the cell transmitting unit 174, the idle cell producing unit 176 produces and sends an idle cell according to the transfer-timing provided by the idle cell transfer-timing unit 175. In contrast to this, when the cell receiving unit 171 receives a series of ATM cells from the transit side through the receiving switch 170, the cell receiving unit 171 discards idle cells including the received ATM cells and sends only user information cells to the AAL unit 163.

Figure 12:
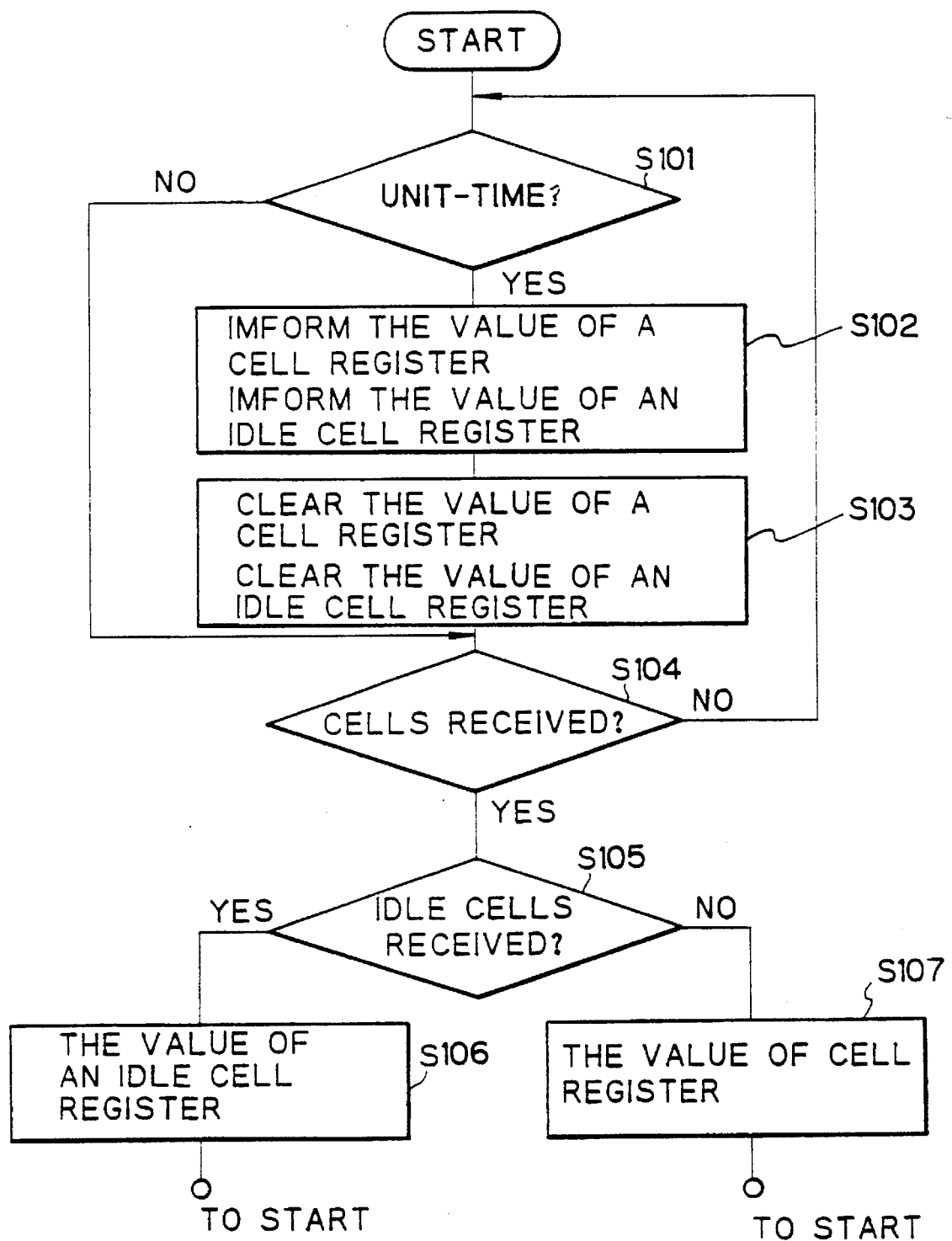
FIG. 12 is an example of the processing flow for measuring the idle cell rate.

FIG. 12 is an example of the processing flow for measuring an idle cell rate. This processing flow is used in the first embodiment of the present invention shown in FIG. 8, and is performed by a cell receiving unit 171 and a cell transmitting unit 174 in FIG. 11. The cell receiving unit 171 has a cell register for storing the number of cell detecting signals corresponding to cell counting means 103 in FIG. 8 and a idle cell register for storing the number of idle cell detecting signals corresponding to idle cell counting means 104 in FIG. 8. Similarly, the cell transmitting unit 174 has a cell register for storing the number of cell transmitting signals and a idle cell register for storing the number of idle cell producing signals.

In FIG. 12, at the beginning it is decided whether a unit-time has been passed or not in step S101. If the decision regarding the unit-time has passed (YES in step S101), the values of the cell register and the idle cell register described above are provided to an arithmetic unit inside the cell receiving unit or the cell transmitting unit, and then the values of the cell register and the idle cell register are cleared (step S103). After step S103 or if the decision regarding the unit-time has not passed (NO in step S101), it is decided whether there is a received cell or not in step S104. If there is a received cell (YES in step S104), it is decided whether the received cell is an idle cell or not in step S105, and further if the received cell is an idle cell (YES in step S105), the value of the idle cell register is increased (+1) in step S106. Conversely, if the received cell is not an idle cell (NO in step S105), that is a user information cell, the value of the cell register is increased (+1) in step S107. Although not shown in FIG. 12, when the cell receiving unit 171 is informed of the value (N) of the cell register and the value (M) of the idle cell register in step S102, the cell receiving unit 171 calculates an equation M/(M+N) corresponding to an idle cell rate and provides the calculated value of M/(M+N) to a device control unit 164 in FIG. 10.

In this way, at an interval of one unit-time (e.g., 1 sec. or 500 msec., etc.) the device control unit 164 is informed of the calculated value of M/(M+N), which is an idle cell rate. The closer the idle cell rate is to zero, the smaller is a user band width for a user information cell. Therefore, the device control unit 164 can perform a traffic control at real time by monitoring the idle cell rate as a parameter of the traffic control.

Figure 13:
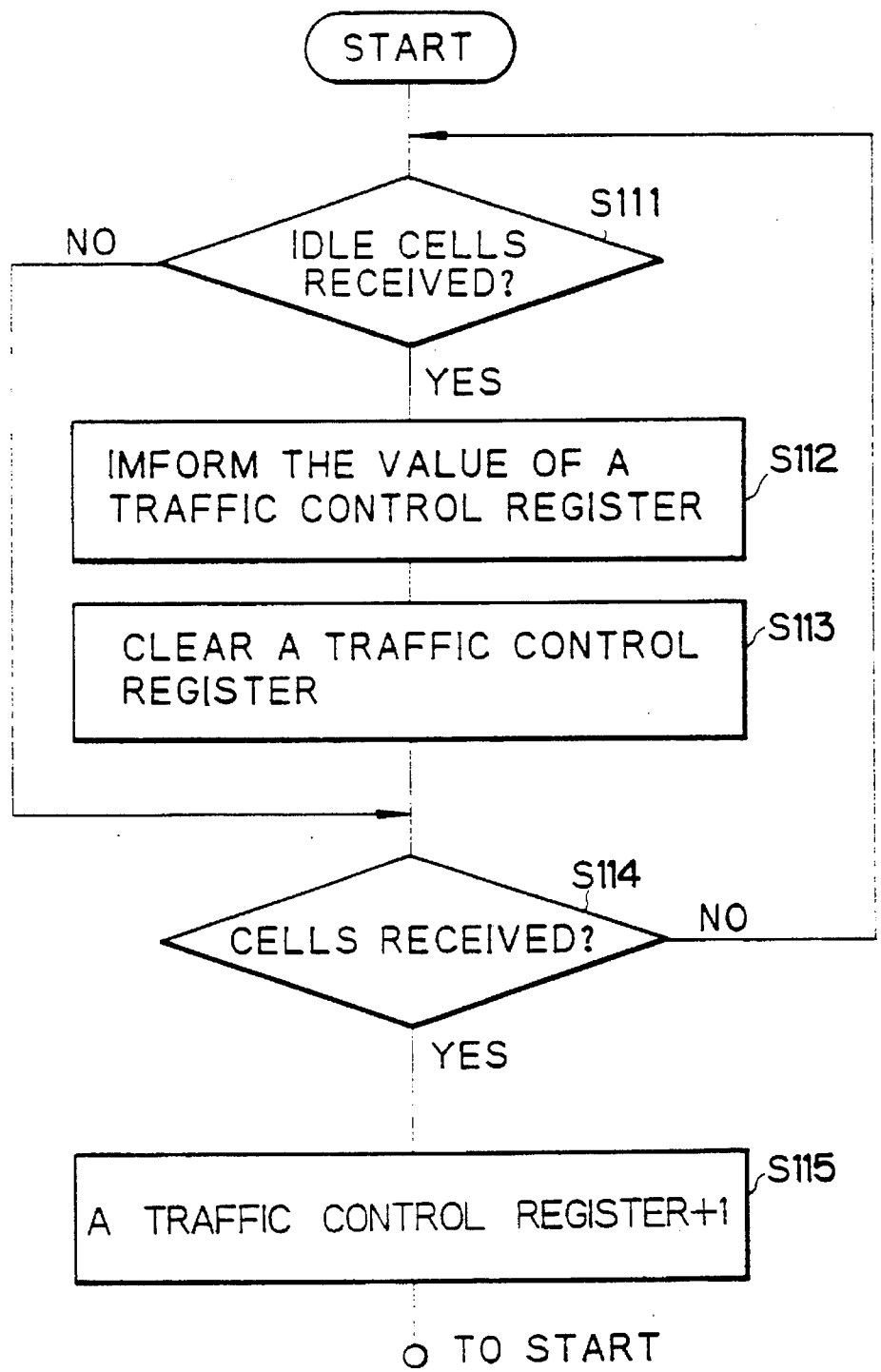
FIG. 13 is an example of the processing flow for measuring the interval at which the idle cell is received.

FIG. 13 is an example of the processing flow for measuring an interval at which an idle cell is received. This processing flow is used in the second embodiment of the present invention shown in FIG. 9, and performed by a cell receiving unit 171 and a cell transmitting unit 174 in FIG. 11. In this example, the cell receiving unit 171 and the cell transmitting unit 174 has a traffic control register corresponding to traffic counting means 108 in FIG. 9.

In FIG. 13, it is decided whether an idle cell has been received or not in step S111. If there is a received idle cell (YES in step S111), the value of the traffic control register is provided to a device control unit 164 in FIG. 10 (Step S112), and the value of the traffic control register is then cleared (S113). Thereafter or if there is no received idle cell (NO in step S111), it is decided whether an user information cell has been received or not in step S114. If the received cell is a user information cell (YES in step S114), the value of the traffic control register is increased (+1) in step S115.

As described above, the traffic control register is successively increased when receiving a series of user information cells, and when a new idle cell is received, the device control unit 164 is informed of the increased value of the traffic control register. Therefore, the large value of the traffic control register indicates a great possibility of bursting into congestion. Conversely, the small value of the traffic control register indicates a small possibility of bursting into congestion. Thus, the device control unit 164 can perform a traffic control at real time by using the value of the traffic control register as a parameter of the traffic control.

Figure 14:
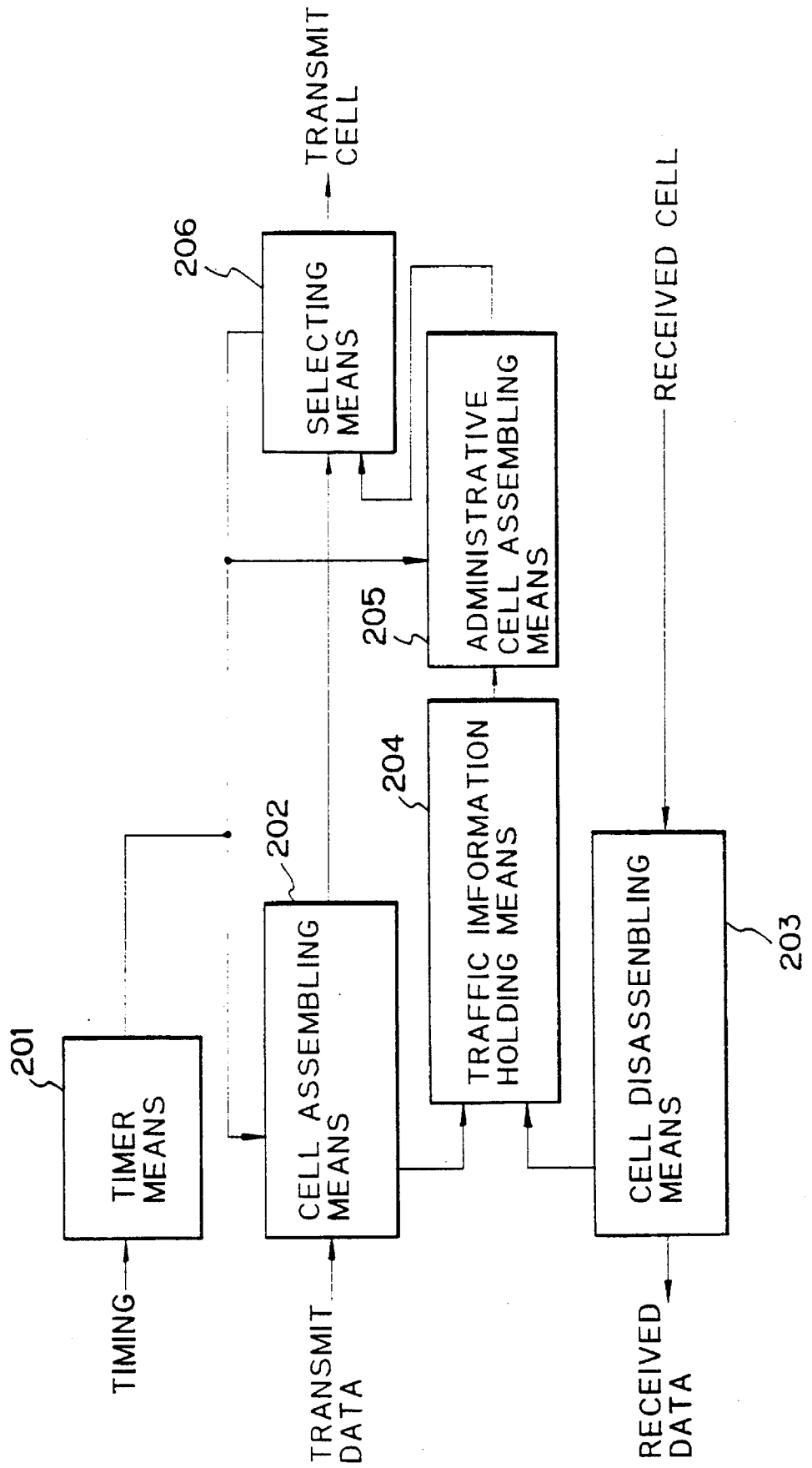
FIG. 14 is a block diagram showing a third constitution of the present invention.
Figure 15:
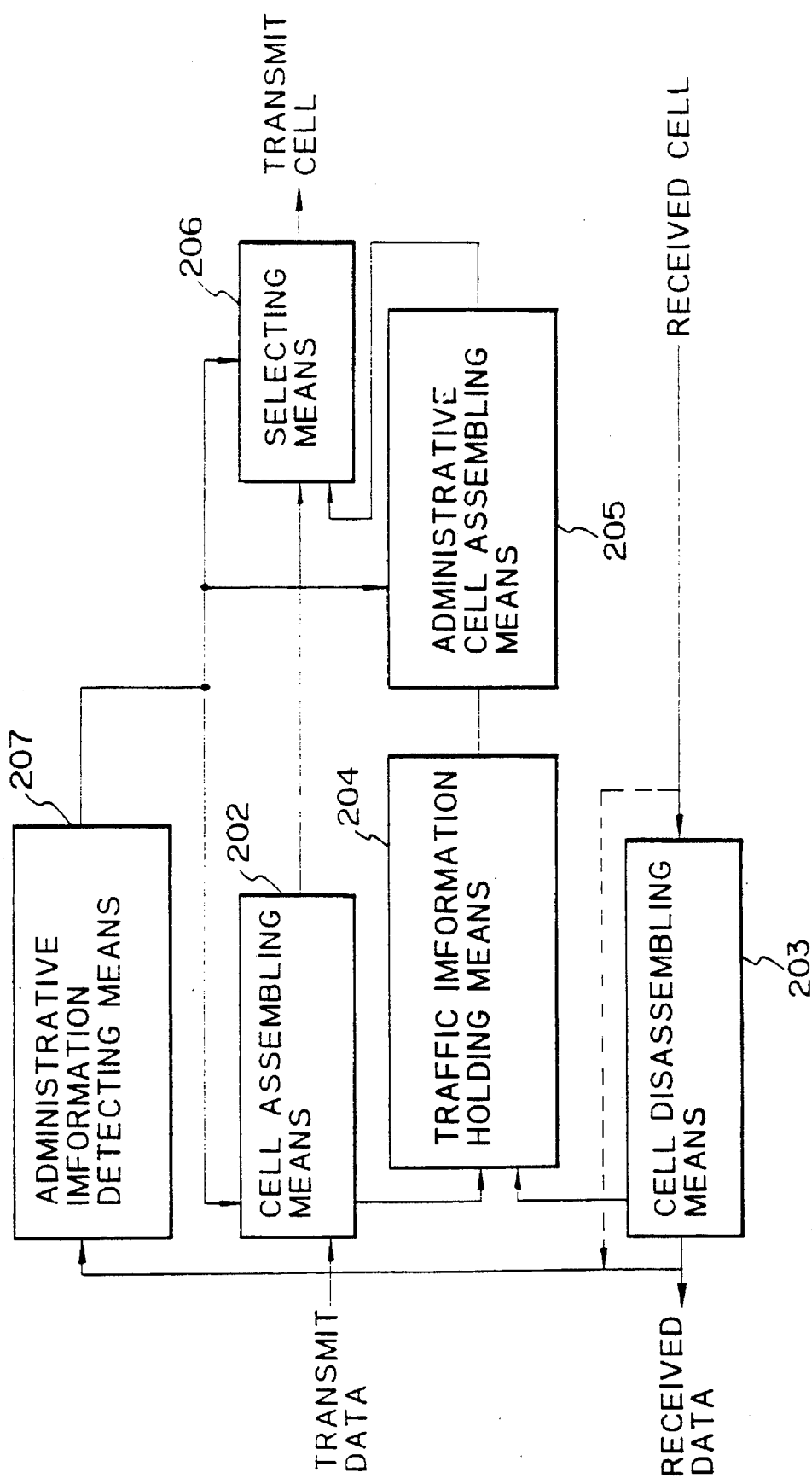
FIG. 15 is a block diagram showing a fourth constitution of the present invention.
Figure 16:
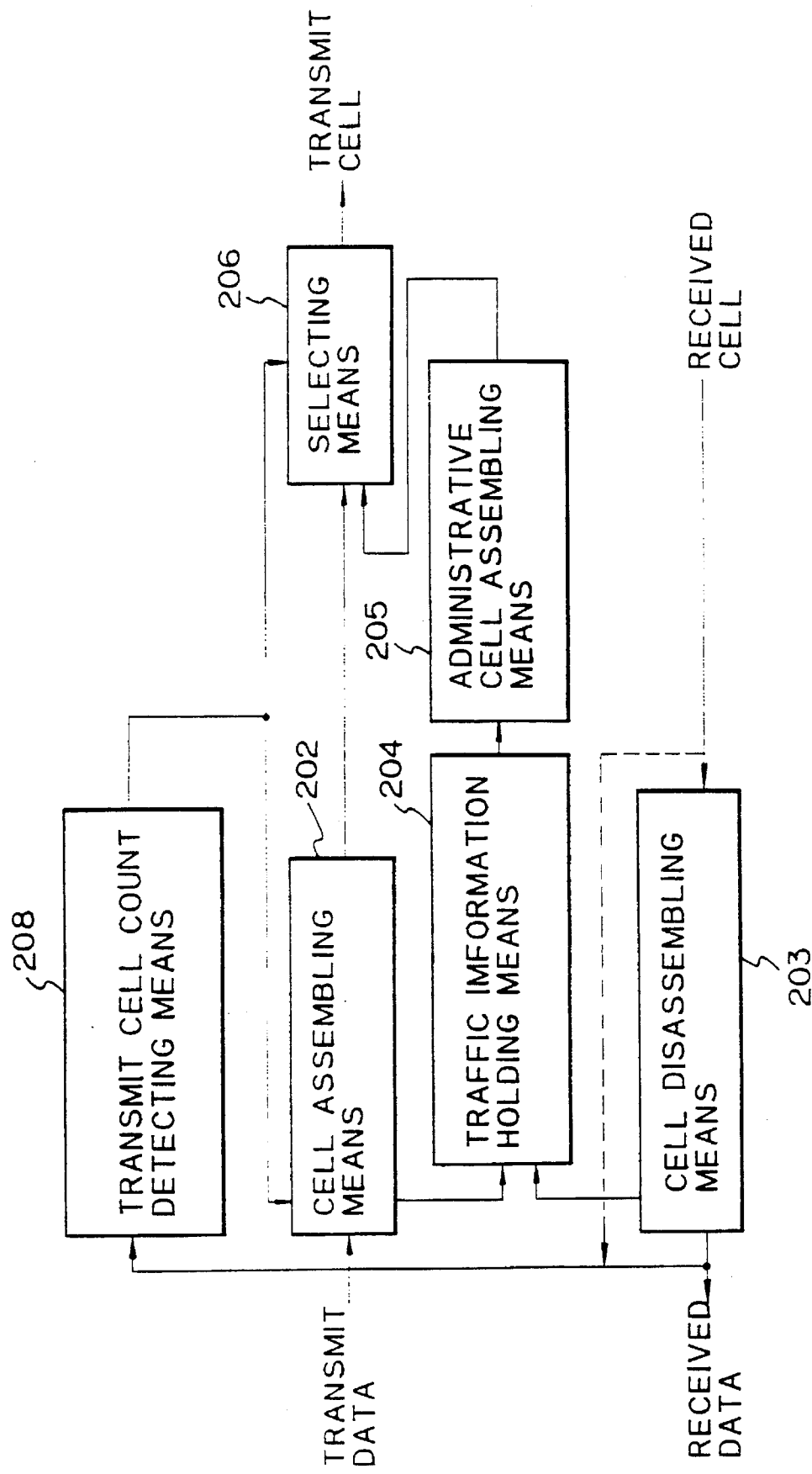
FIG. 16 is a block diagram showing a fifth constitution of the present invention.

FIG. 14–16 are block diagrams of an apparatus for supervising and controlling ATM traffic, which uses administrative cells transferring traffic information to manage a network, and respectively showing basic constitutions from the third to fifth constitution of the present invention.

As shown in FIG. 14, which shows the third constitution of the present invention, an apparatus for supervising and controlling ATM traffic consists of the following means. Timer means 201 outputs a timing signal to transfer administrative cells at regular intervals. Cell assembling means 202 assembles transmit cells from transmit data and interrupts the output of the transmit cells by the timing signal from the timer means 201. Cell disassembling means 203 disassembles received cells into received data. Traffic information holding means 204 holds traffic information received from the cell assembling means 202 and the cell disassembling means 203. Administrative cell assembling means 205 assembles the administrative cells having the traffic information from the traffic information holding means 204 in accordance with the timing signal from the timer means 201. Also, selecting means 206 exchanges output cells from the transmit cell from the cell assembling means 202 with the administrative cells from the administrative cell assembling means 205 in accordance with the timing signal from the timer means 201.

In FIG. 15, which shows the fourth constitution of the present invention, an apparatus for supervising and controlling ATM traffic uses administrative information detecting means 207 for detecting a transmit request of said administrative cells from received cells instead of the timer means 201 described above in FIG. 14.

Further, in FIG. 16, which shows the fifth constitution of the present invention, an apparatus for supervising and controlling ATM traffic uses transmit cell count detecting means 208 for outputting a detecting signal when a transmit cell count is up to a predetermined number at regular intervals instead of the timer means 201 described above in FIG. 14.

In FIG. 14, the traffic information holding means 204 temporarily stores traffic information, e.g., cell counts from the cell assembling means 202 and the cell disassembling means 203, etc., into an internal memory. The timer means 201 send a timing signal for assembling an administrative cell and transferring it to the cell assembling means 202 described above, and the administrative cell assembling means 205 for assembling traffic information and the selecting means 206 described above. The administrative cell assembling means 205 assembles the administrative cell containing the traffic information in accordance with the timing signal described above, and sends it to a so-called network management unit for centralized management of the networks. At this time, transmission of the transmit cells from the cell assembling means 202 is temporarily interrupted and the selecting means 206 selects a path on the side of the administrative cell assembling means 205. Therefore, in this case, the administrative cell is transferred at regular intervals.

The administrative information detecting means 207 in FIG. 15 analyzes the traffic information contained in received administrative cells, which are sent from the network management unit described above, and provides the same indication as that by the timing signal of the timer means 201 shown in FIG. 14. In this case, the administrative cell is transferred by the indication sent from the network management unit.

The transmit cell count detecting means 208 in FIG. 16 indicates the same operation as that of the timer means 201 or the administrative information detecting means 207 described above, when the number of transmit cells is exceeds a predetermined number for a predetermined time. Therefore, in this case, the administrative cell is transferred by a transmit cell count for a predetermined time.

Figure 17:
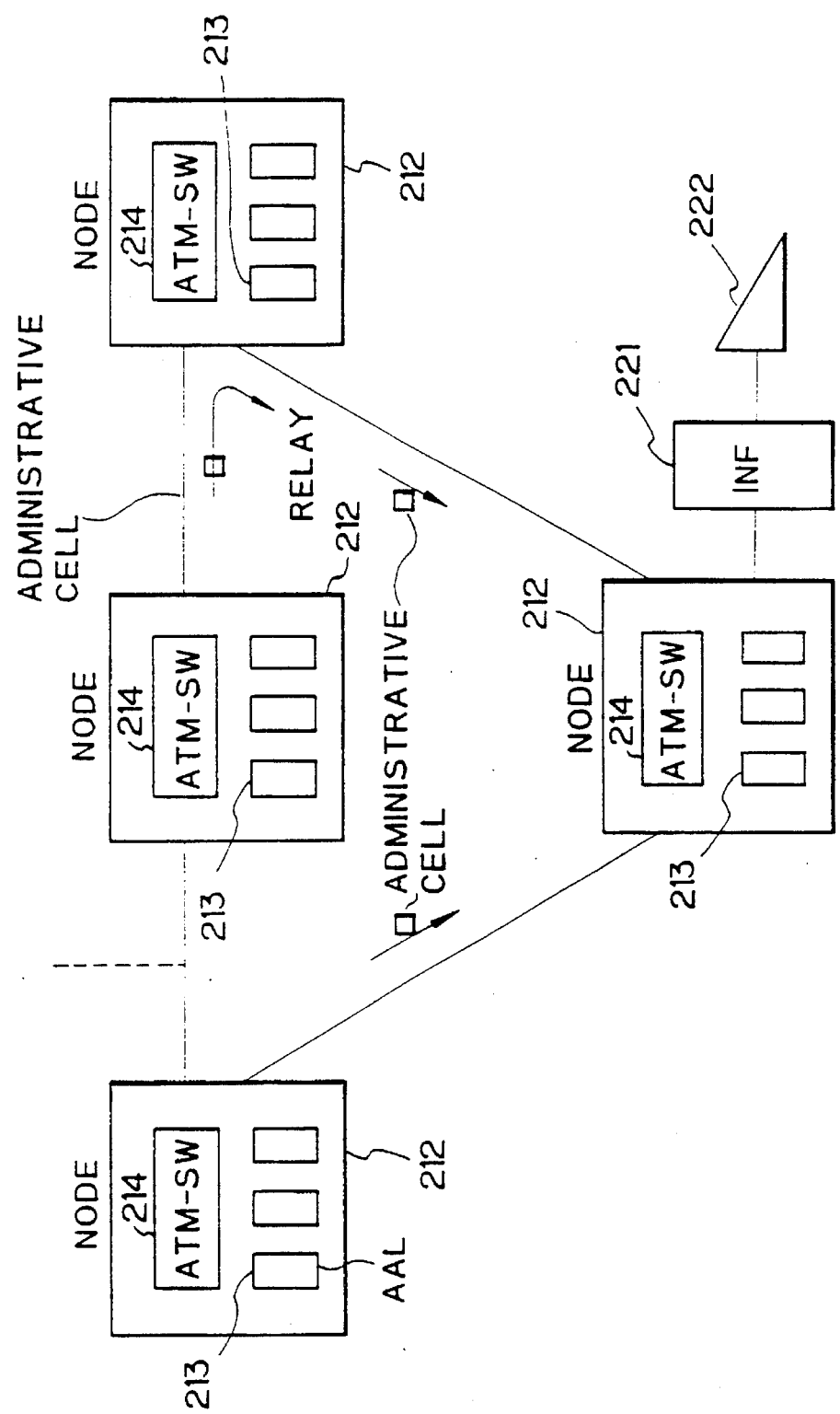
FIG. 17 is an embodiment of a network centralized control system using an administrative cell according the present invention.
Figure 18:
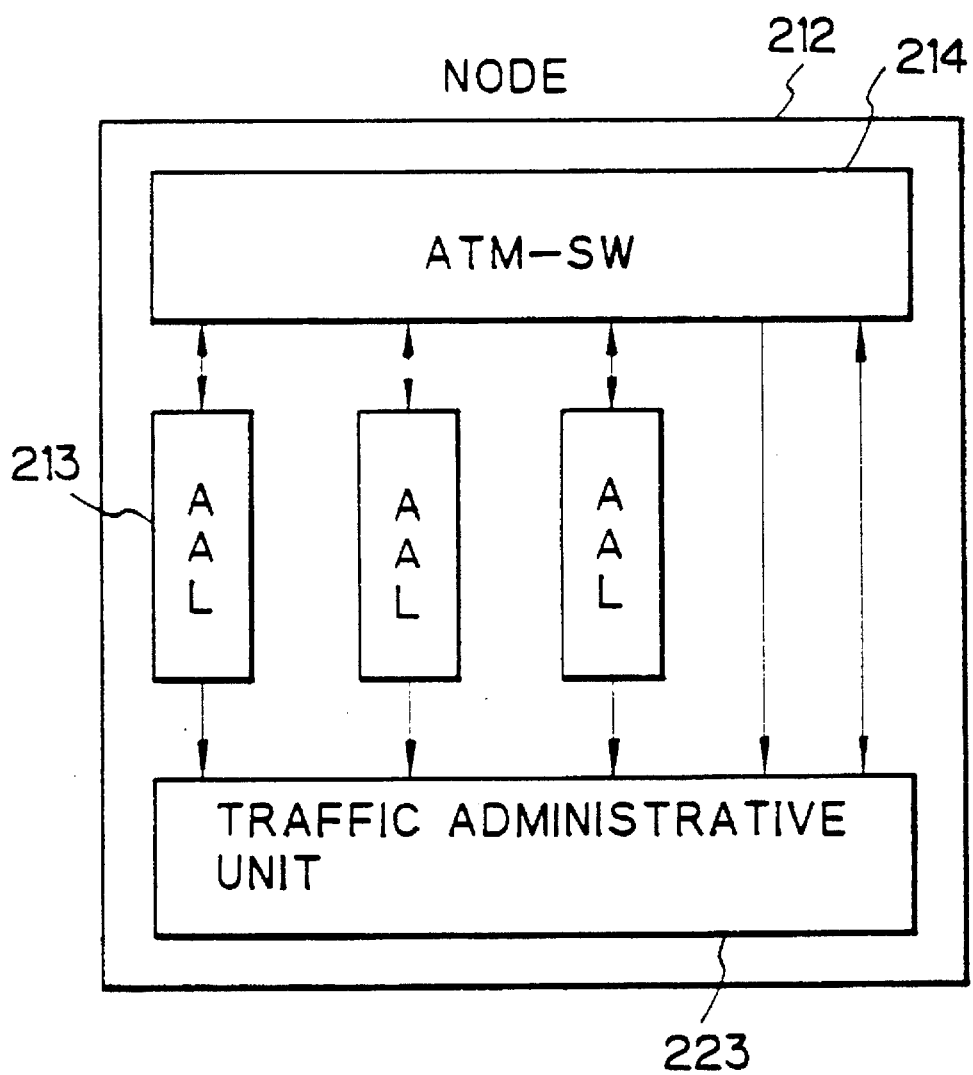
FIG. 18 is an embodiment of a network individual control system of a type of stand-alone system using an administrative cell according the present invention.

FIG. 17 shows an embodiment of a network centralized control system using an administrative cell according to the present invention, and FIG. 18 shows an embodiment of a network individual control system such as a stand-alone system using an administrative cell according to the present invention.

The network management apparatus shown in FIG. 14 to 16 as described above are included in AAL 213 and an ATM switch 214 as a partial function of those. For example, timer means 201, cell assembling means 202, cell disassembling means 203, traffic information holding means 204 and administrative cell assembling means 205 in FIG. 14 are realized as a function of the AAL 213, and selecting means 206 is realized as a function of the ATM switch 214.

In FIG. 17, AAL 213 of each communication node 212 has the function of counting the number of received cells, and an ATM switch 214 has the function of detecting traffic congestion and counting the number of cells distributed to each VPI and also detects the maximum number of queuing cells sent to each patch. The communication node 212 sends an administrative cell having the traffic information described above to a network management unit. The network management unit comprises a communication node 212, an interface unit (INF) 221 and a management terminal 222. The management terminal 222 consists of a computer system or an exclusive management apparatus, and communicates with the communication node 212 over the interface unit 221. The network management unit described above recognizes a congestion state or the possibility of causing a congestion state by receiving traffic information from the AAL 213 and the ATM switch 214, and then indicates the ATM switch 214 so as to exchange an allocation of newly established VPI or the AAL 213 to stop a cell output.

An administrative cell is formed by causing the value of PT bits to be 110 as shown in FIG. 5. There are two cases for sending the administrative cell to the network management unit described above. One is a case that an AA1 213 changes the all zero value of VPI/VCI of the administrative cell, as shown in FIG. 5, to the value of VPI/VCI allocated to the AA1 213 remaining PT=110 and sends the administrative cell to a communication path, and the other case is the administrative cell being sent to a communication path without changing the value of VPI/VCI of the administrative cell (VPI/VCI bits are all zero). In the former case the communication path is fixed by the allocated value of VPI/VCI of the administrative cell, and in contrast to this, in the latter case an ATM switch 214 can select an unoccupied path between plural paths by using the path distributing function of the ATM switch 214 so that an influence on the transmission of other data cell can be minimized.

FIG. 18 shows an embodiment in which traffic administrative unit 223 performs an inside network management of the communication node 212 by using an administrative cell that is transmitted in the communication node 212. The traffic administrative unit 223 partially functions as a network management unit as described above in an inside area of the communication node 212. For example, the traffic administrative unit 223 recognizes a state of congestion or the possibility of causing a state of congestion by receiving traffic information from AAL 213 and an ATM switch 214, and then requests a cell output to stop from VPI allocated to the ATM switch 214 and/or from the AAL 213 in accordance with the traffic information. The traffic administrative unit 223 then sends an administrative cell having information as described above to a traffic administrative unit 223 of the other counterpart communication node 212 and a network management unit described above. The network management unit allocates other VPI to the AAL 213, which stopped a cell output. Also, in another application, a traffic administrative unit 223 may stop a cell output or exchange VPI by informing a network management unit of VPI and an AAL 213 in a state of congestion or those having the possibility of causing a state of congestion.

Figure 19:
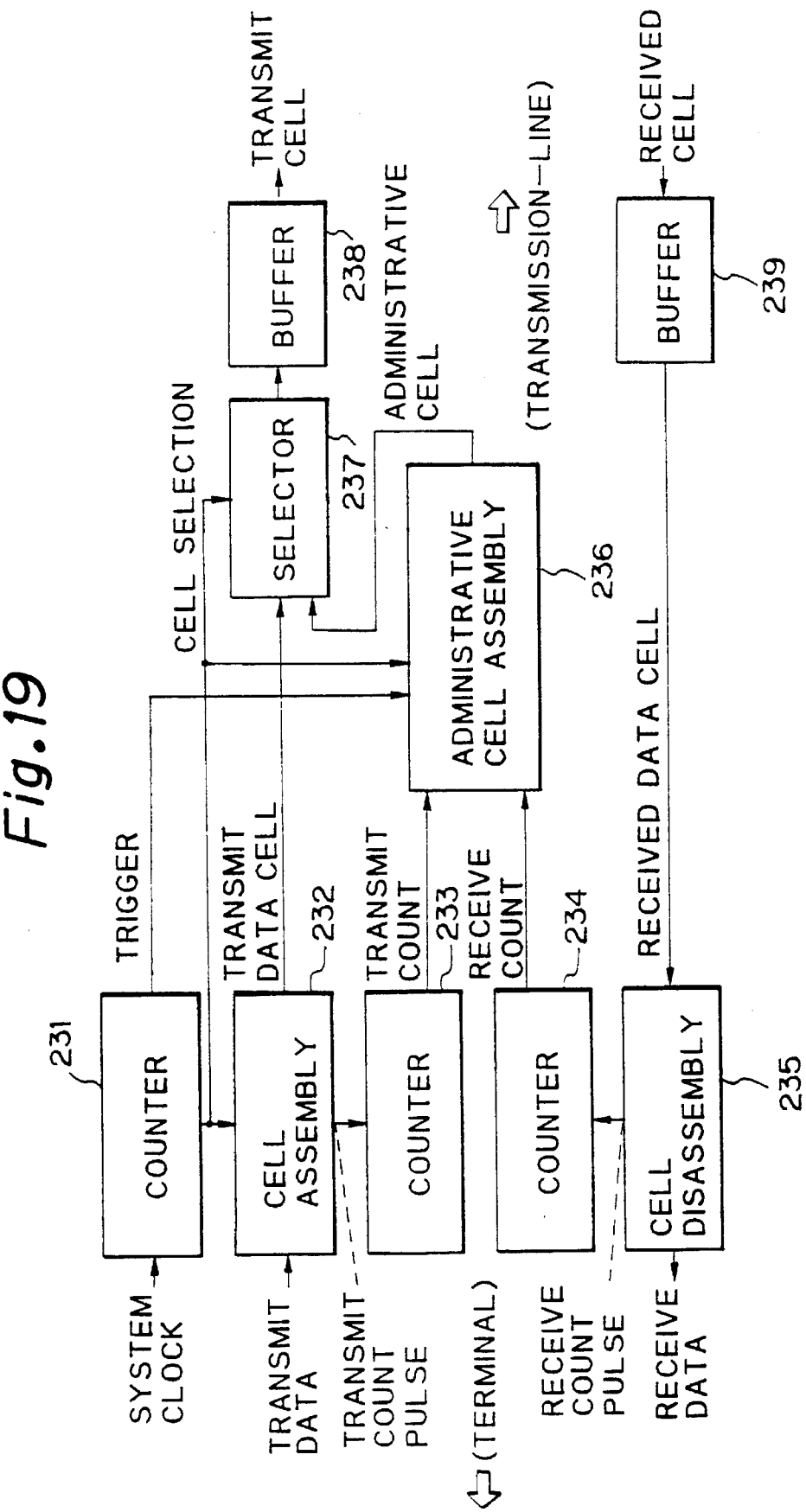
FIG. 19 is a concrete embodiment of the present invention shown in FIG. 14.
Figure 20:
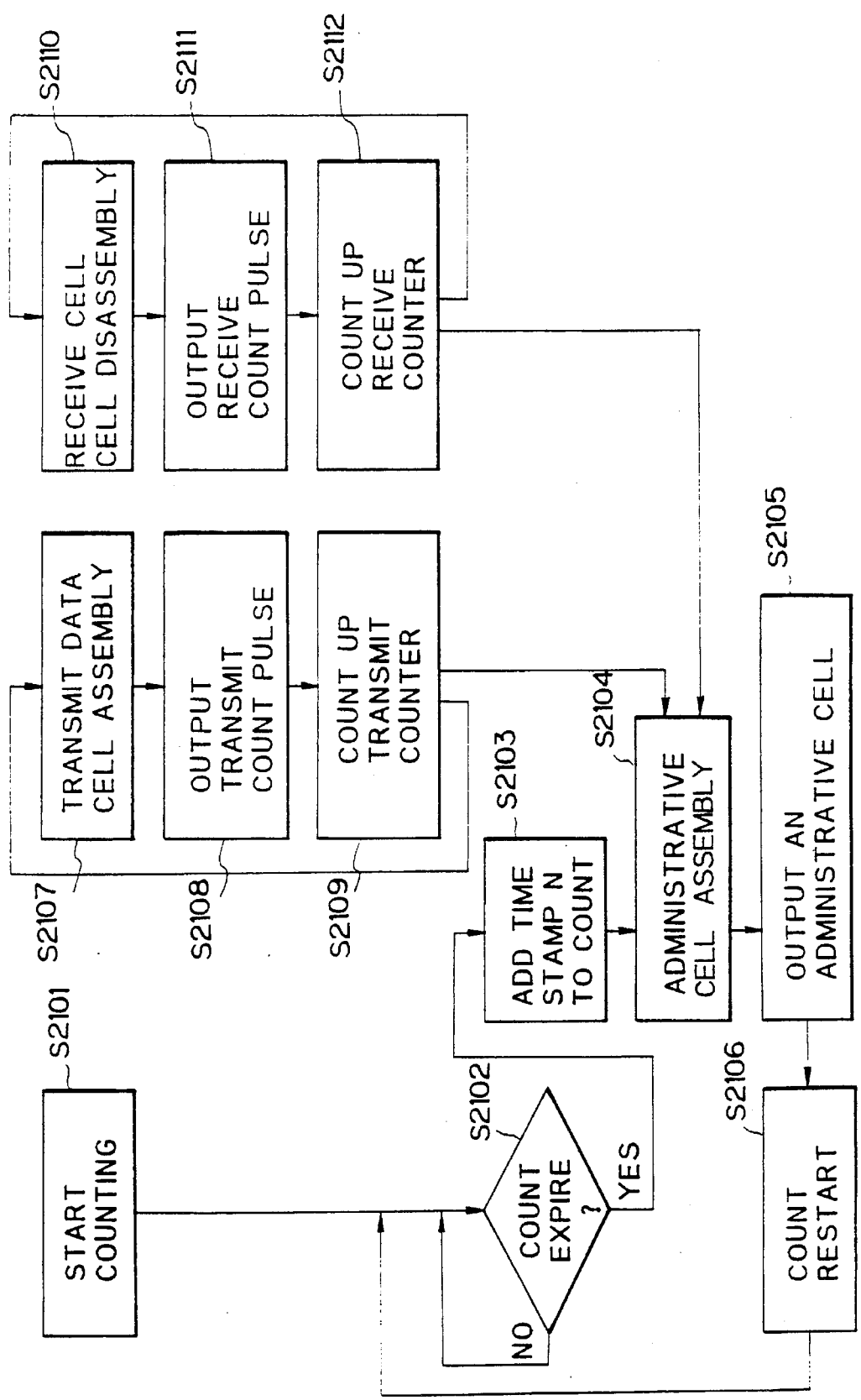
FIG. 20 is an example of a control flowchart for the apparatus shown in FIG. 19.

FIG. 19 shows a concrete embodiment of a network management apparatus according to the present invention shown in FIG. 14, and FIG. 20 is an example of a control flowchart applied to the network management apparatus in FIG. 19.

In relation to FIG. 19 and FIG. 14, a counter 231, a cell assembling circuit 232, a cell disassembling circuit 235, an administrative cell assembling circuit 236 and a selector 237 in FIG. 19 correspond to timer means 201, cell assembling means 202, cell disassembling means 203, administrative cell assembling means 205 and selecting means 206 respectively, and a counter 233 and a counter 234 in FIG. 19 correspond to traffic information holding means 204 in FIG. 14.

Figure 3:
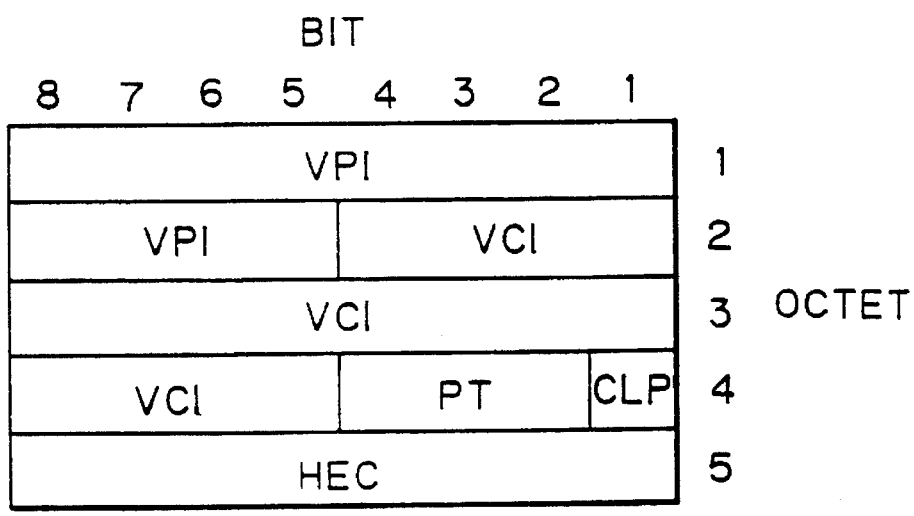
FIG. 3 is a header structure in which coding schemes are adopted according to NNI.

The counter 231 counts an external system clock, and when counting the system clock up to a count value initially set up by a processor on the system side, the counter 231 periodically outputs a trigger pulse. In order to convert transmit data into a data format as shown in FIG. 2 and 3, in the case of analog voice signal processing, the cell assembling circuit 232 converts the analog signal into a digital signal by an analog to digital converter (A/D converter) and thereafter performs the serial-parallel conversion (S/P conversion). The cell assembling circuit 232 assembles a data cell by writing parallel data into a 48 bytes buffer memory in turn and adding a 5 bytes cell header to the 48 bytes data written in the buffer memory. In the case of digital data signal processing the A/D converter (the S/P conversion may be included) in the cell assembling circuit 232 is unnecessary. The cell disassembling circuit 235 inversely operates against the operation of the cell assembling circuit 232 as described above. The cell assembling circuit 232 breaks cell segmentating operation for a transmission period of an administrative cell started by the trigger signal described above from the counter 231. The counters 233, 234 count up a buffering end signal from the 48 bytes buffer memory e.g., expiration signal from a 48 bytes FIFO (first in first out) memory, etc. The administrative cell assembling circuit 236 starts a cell assembling operation by the trigger signal from the counter 231, and thereby imparts a count value of the counter 233, 234 to an information field of an ATM cell and further adds a header having PT bits=110, as described above, to the information field of an ATM cell and finally assembles an administrative cell as shown in FIG. 5. The selector 237 selects and outputs either a data cell from the cell assembling circuit 232 or an administrative cell from the administrative cell assembling circuit 236. The selector 237 outputs the administrative cell for a transmission period of an administrative cell started by the trigger signal from the counter 231. Buffer circuits 238 and 239 temporarily store a transmit cell and a received cell, respectively.

FIG. 20 is an example of a control flowchart for an apparatus as described above in FIG. 19. In step S2101, a counter 231 described above starts counting an external system clock. In step S2102, it is decided whether a count value of the counter 231 is up to a predetermined value. If the count value is up to the predetermined value, a time stamp is added to the number counted up to the predetermined value (S2103). Next, an administrative cell is assembled by an administrative cell assembling circuit 236 as described above, at that time, transmit and received cell count values of a cell assembling circuit 232 and a cell disassembling circuit 235 are read from a counter 233, 234 and written on an information field of the assembled administrative cell (S2104). In step S2105, the administrative cell is output through a selector 237 that selects a administrative cell output path, and thereafter a counter 231 restarts (S2106) and each step after S2102 described above is repeatedly performed. Therefore, in this embodiment traffic information is collected at a constant period, and the collected traffic information is sent by way of an administrative cell.

Figure 21:
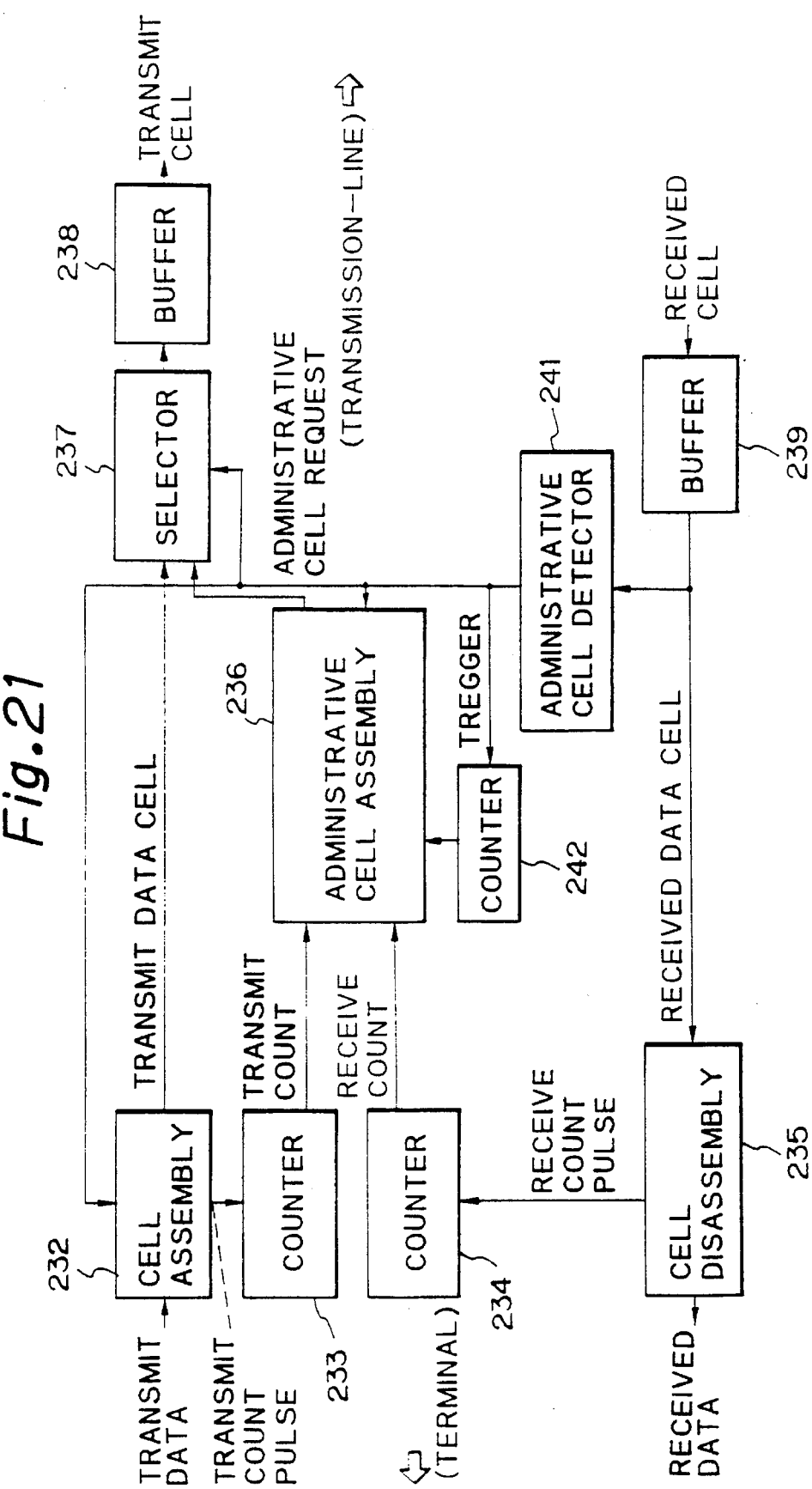
FIG. 21 is a concrete embodiment of the present invention shown in FIG. 15.
Figure 22:
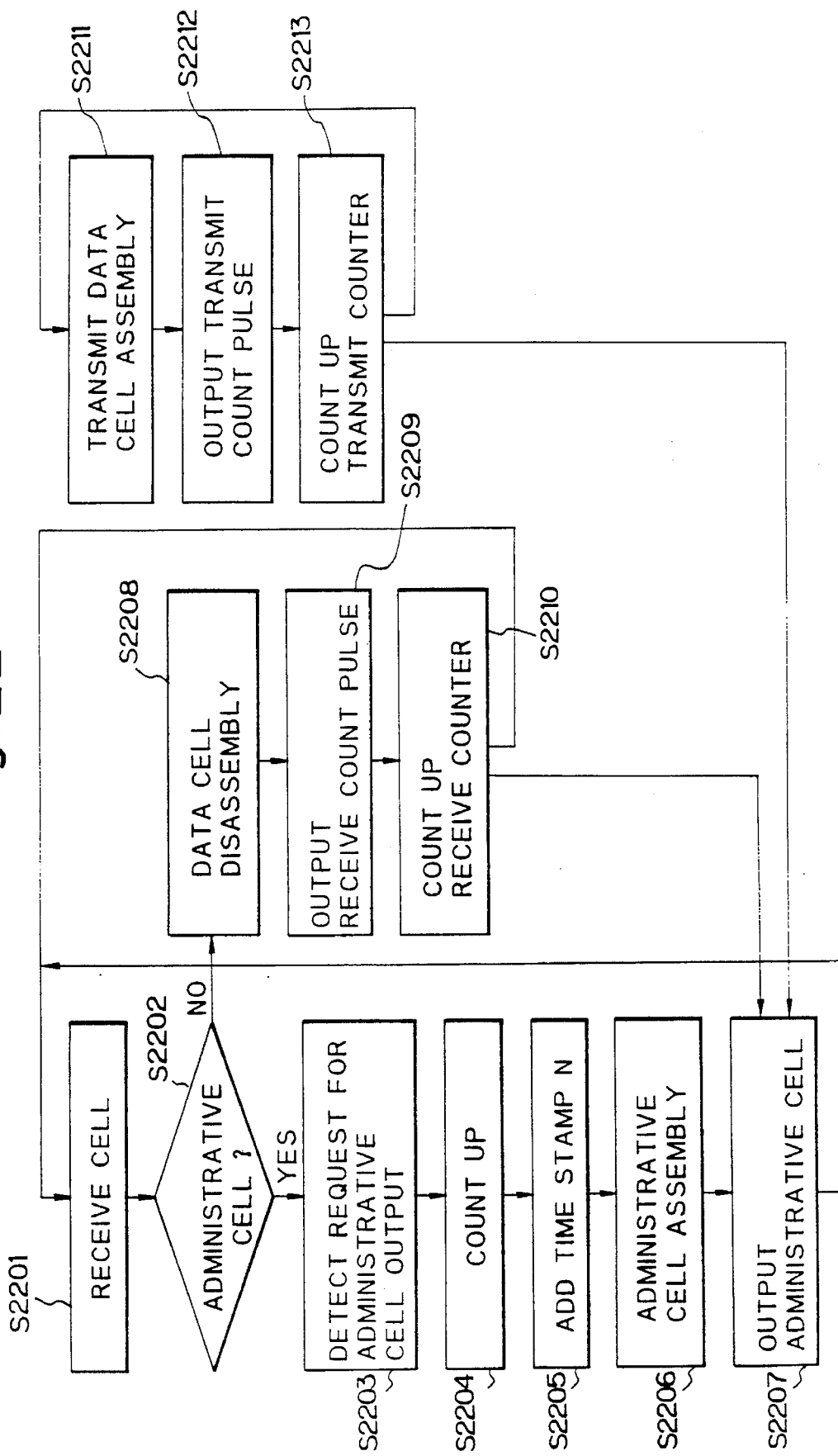
FIG. 22 is an example of a control flowchart for the apparatus shown in FIG. 21.

FIG. 21 shows a concrete embodiment of a network management apparatus according to the present invention shown in FIG. 15, and FIG. 22 is an example of a control flowchart applied to the network management apparatus in FIG. 21.

In relation to FIG. 21 and FIG. 15, an administrative cell detecting circuit 241 in FIG. 21 corresponds to administrative information detecting means 207 in FIG. 15, and the other units in FIG. 21 are the same as those described above in FIG. 19, thus the explanation thereof is omitted. The difference between FIG. 21 and FIG. 19 is that an administrative cell is assembled at a constant period produced by a counter 231 in FIG. 19, in contrast to this, in FIG. 21 the administrative cell detecting circuit 241 receives an administrative cell sent from a center network management unit, and a communication node 212 assembles and sends an administrative cell having traffic information collected in accordance with an indication contained within the received administrative cell. Thus, the administrative cell detecting circuit 241 is used instead of the counter 231 in FIG. 19. The administrative cell detecting circuit 241 basically has the same constitution as a cell disassembling circuit 235 described above in that the administrative cell detecting circuit 241 receives data contained within a received cell. Therefore, the cell disassembling circuit 235 can be used as the administrative cell detecting circuit 241, and as shown in FIG. 15 or FIG. 21 the administrative cell detecting circuit 241 can be arranged at a post or front stage of the cell disassembling circuit 235. Further, instead of the administrative cell detecting circuit 241 in FIG. 21, the cell disassembling circuit 235 may receive an administrative cell having management information sent from a network management unit and thereafter the management information may be determined. After the administrative cell detecting circuit 241 detects the administrative cell sent from a network management unit, the operation of each unit shown in FIG. 21 is also as that of corresponding unit in FIG. 19, and thus the explanation thereon is omitted.

FIG. 22 is an example of a control flowchart of an apparatus according to the present invention shown in FIG. 21. For convenience, an administrative cell detecting circuit 241, realized as a partial function of a cell disassembling circuit 235 is explained in FIG. 22, and, it is determined whether received cell in step S2201 is an administrative cell or not in step S2202. If it is an administrative cell, a trigger pulse is provided to a counter 242 in FIG. 21 and a number (N) of receiving of an administrative cell of the counter 242 is increased (S2204) and a time stamp is added to the number (N) (S2205). An administrative cell is assembled as described above in step S2206 and is output having traffic information (S2210, S2213) in step S2207. Also, if not an administrative cell (S2202), an ordinal operation for receiving a data cell is performed (S2208–S2210). Therefore, in this embodiment an administrative cell is output according to an instruction sent from a center network management unit.

Figure 23:
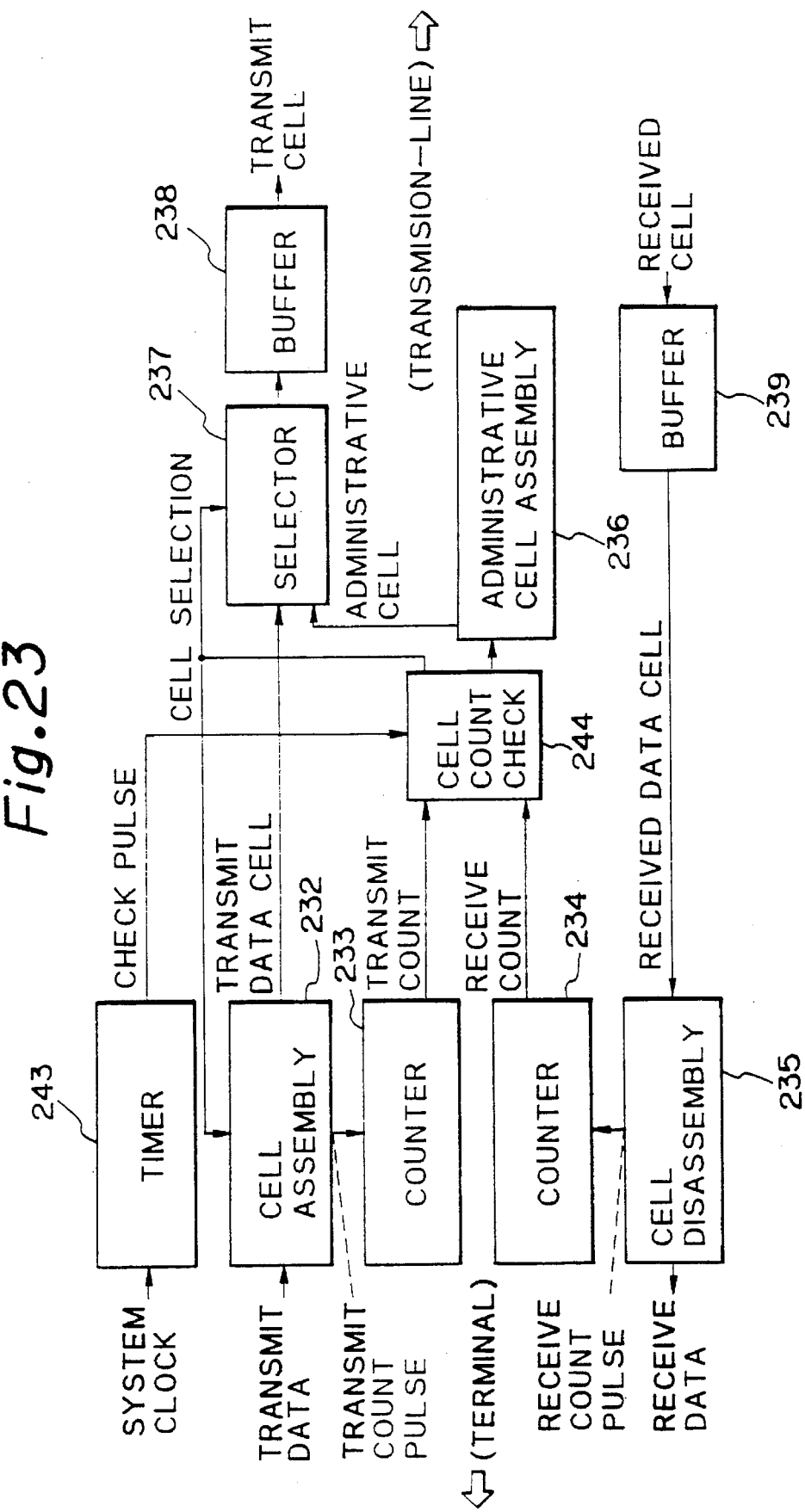
FIG. 23 is a concrete embodiment of the present invention shown in FIG. 16.
Figure 25:
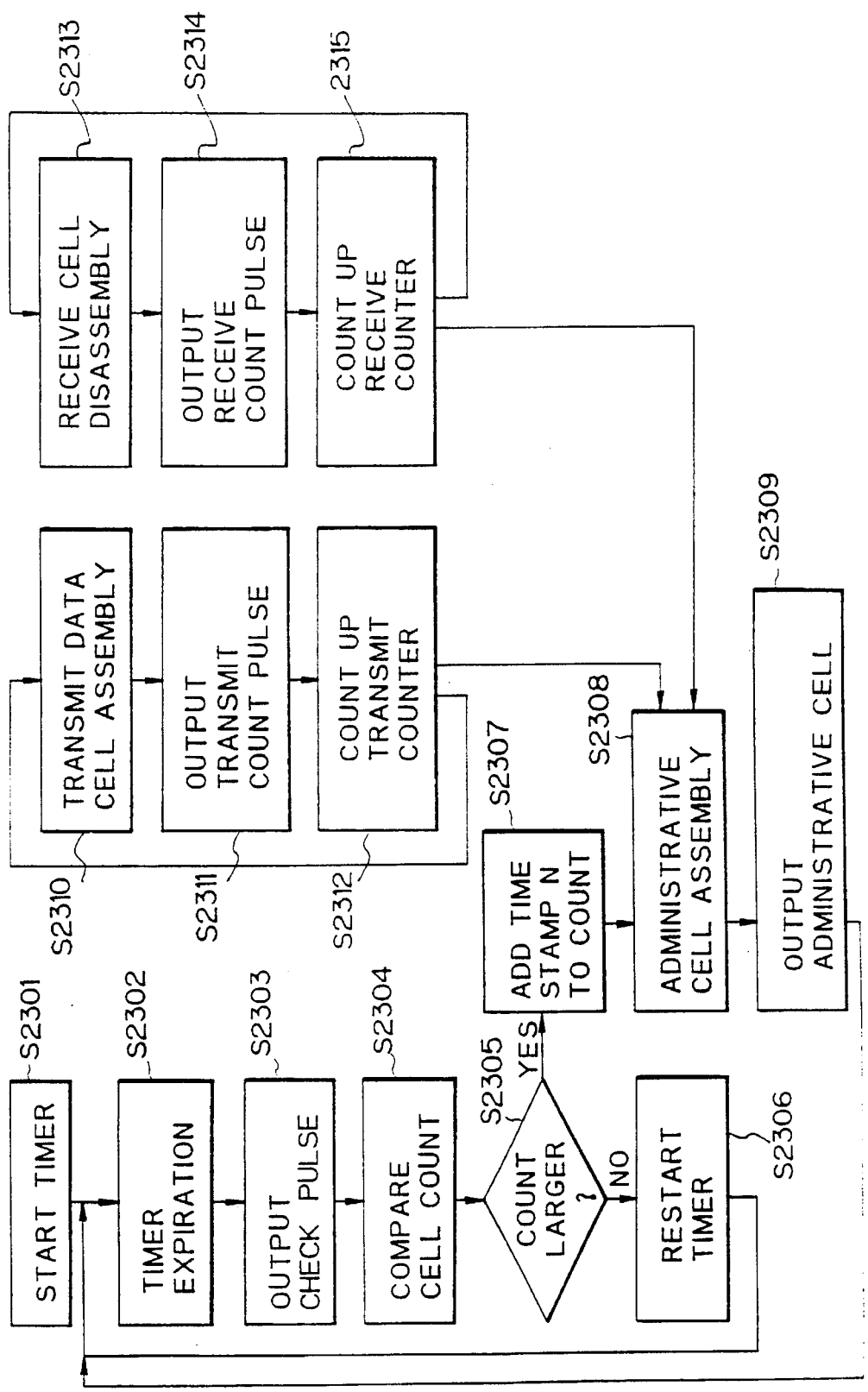
FIG. 25 is an example of a control flowchart for the apparatus shown in FIG. 23.

FIG. 23 shows a concrete embodiment of a network management apparatus according to the present invention shown in FIG. 16, and FIG. 25 is an example of a control flowchart applied to the network management apparatus in FIG. 23.

In relation between FIG. 23 and FIG. 16, a timer 243 and a cell count checking circuit 244 in FIG. 23 correspond to transmit cell count detecting means 208 in FIG. 16, and the other units in FIG. 23 are the same as those described above in FIG. 19, thus an explanation is omitted. The difference between FIG. 21 and FIG. 19 is that an administrative cell is assembled at a constant period produced by a counter 231 in FIG. 19, in contrast to this, in FIG. 23 when the number of sent and received cells attain a predetermined number for a predetermined time produced by the timer 243, namely when causing a traffic congestion state or the possibility of congestion, an administrative cell having traffic information collected up to this time is sent out.

Figure 24:
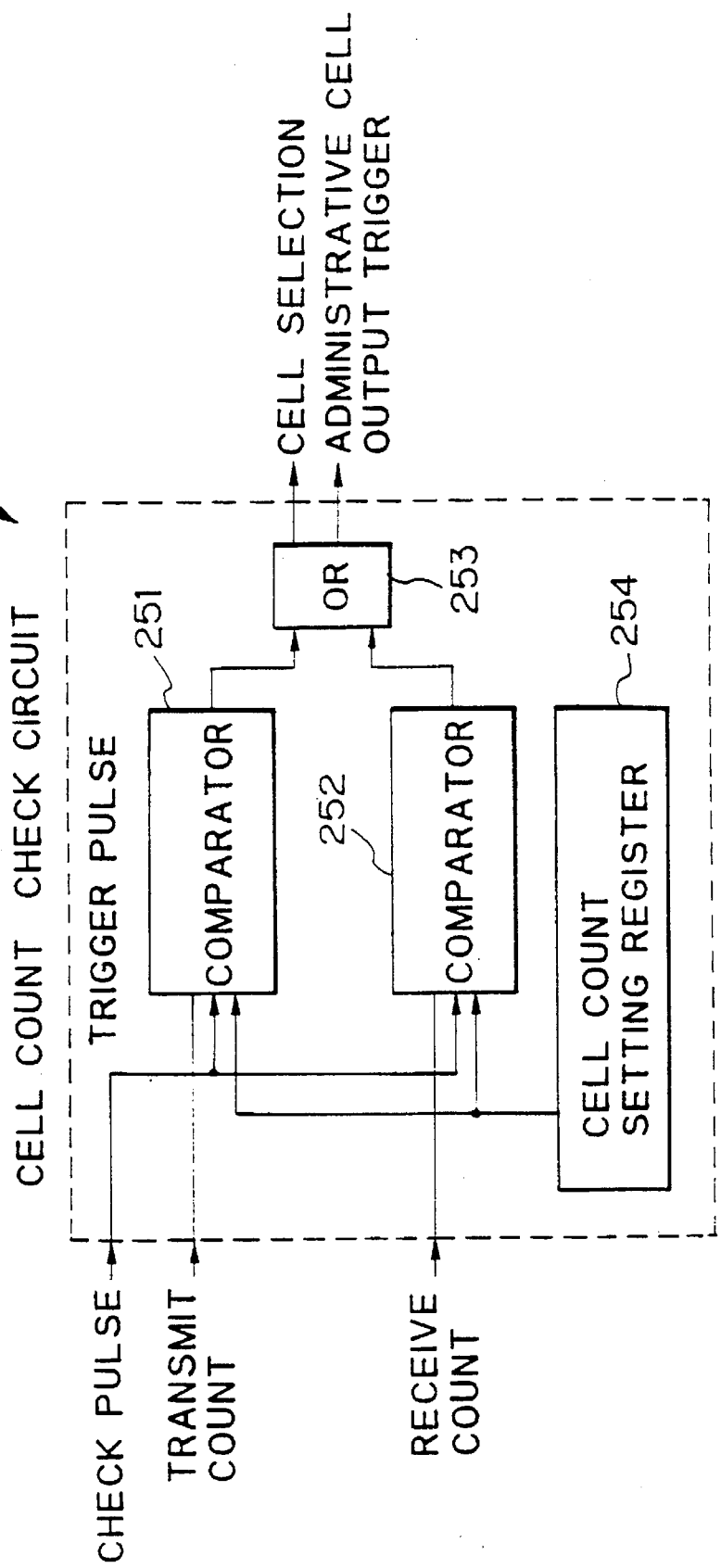
FIG. 24 is an example of arrangement of a cell count checking circuit shown in FIG. 23.

FIG. 24 is an example of an arrangement of a cell count checking circuit 244. A timer 243 counts an external system clock up to the predetermined number, and thereby periodically outputs a check pulse (gate enable signal) that determines a measuring time for counting the number of transmit cells. A comparator 251 of the cell count checking circuit 244 compares a transmit count value from a counter 233 described above in FIG. 19 with an output value from a cell count setting register 254, likewise a comparator 252 of the cell count checking circuit 244 compares a received count value from a counter 234 with an output value from the cell count setting register 254. By either of the two comparisons described above, an output signal of a OR gate circuit 253 is 1, and thereafter the same control as explained in FIG. 19 is performed by using the output 10 signal from the OR gate circuit 253 instead of a trigger signal output from a counter 231 in FIG. 19. Although in the embodiment shown in FIG. 23 both transmit and receiving counters 233, 234 are used, it is possible to make a decision regarding traffic congestion by only watching the side of the transmitter, and in that case the comparator 252 and the OR gate circuit 253 of the receiving side may be eliminated.

FIG. 25 is an example of a control flowchart of an apparatus according to the present invention shown in FIG. 23. A timer 243 starts in step S2301 and when the count of the timer 243 reaches a predetermined number (S2302), the timer 243 outputs a check pulse described above (S2303). A cell count check circuit 244 determines the number of cells provided by counter 233, 234 at a constant period that is determined by the check pulse output (S2304). If a count value of a transmit cell or received cell is larger than a set value of a cell count setting register 254, a time stamp is added to a count value (N) of the timer 243 (S2305, S2307). At the same time, an administrative cell having traffic current information is assembled and sent out (S2308, S2309). Conversely, if the count value of a transmit cell or received cell is smaller than the set value of the cell count setting register 254, the timer 243 is restarted (S2306), and thereafter each step after S2302 described above is performed repeatedly. Therefore, in this embodiment, sent cells or received cells for a predetermined period are counted, and when the count value described above is larger than a predetermined count value, an administrative cell is assembled and sent out.

Figure 26:
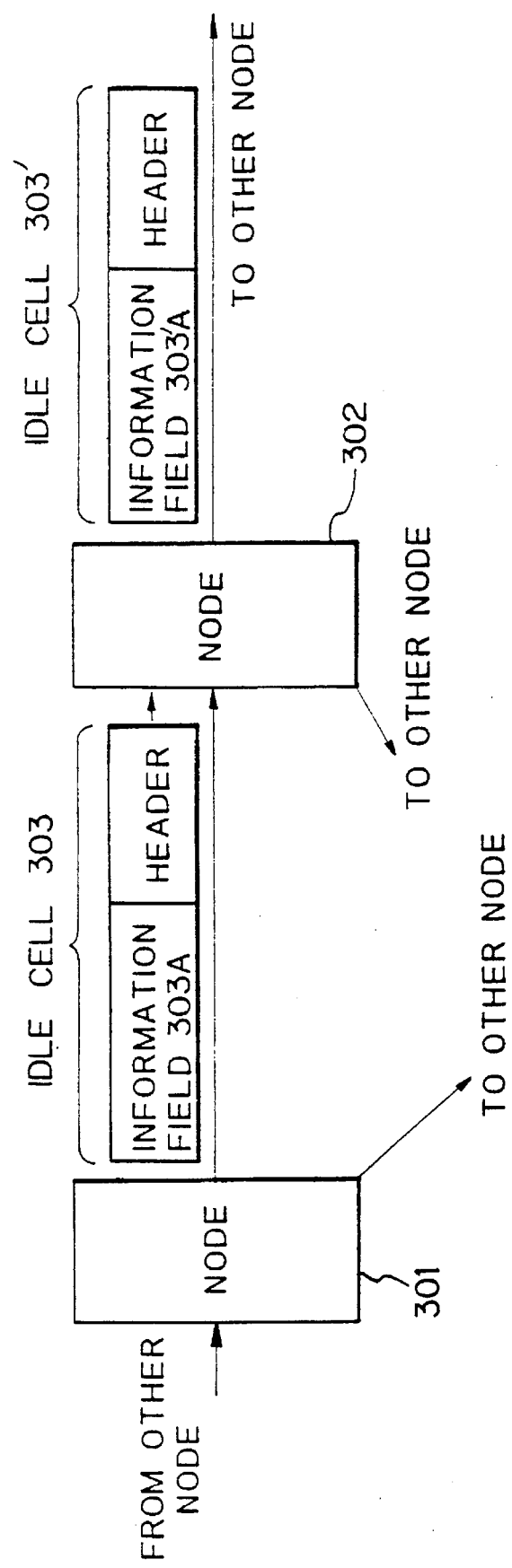
FIG. 26 is a block diagram schematically showing a sixth constitution of the present invention.
Figure 27:
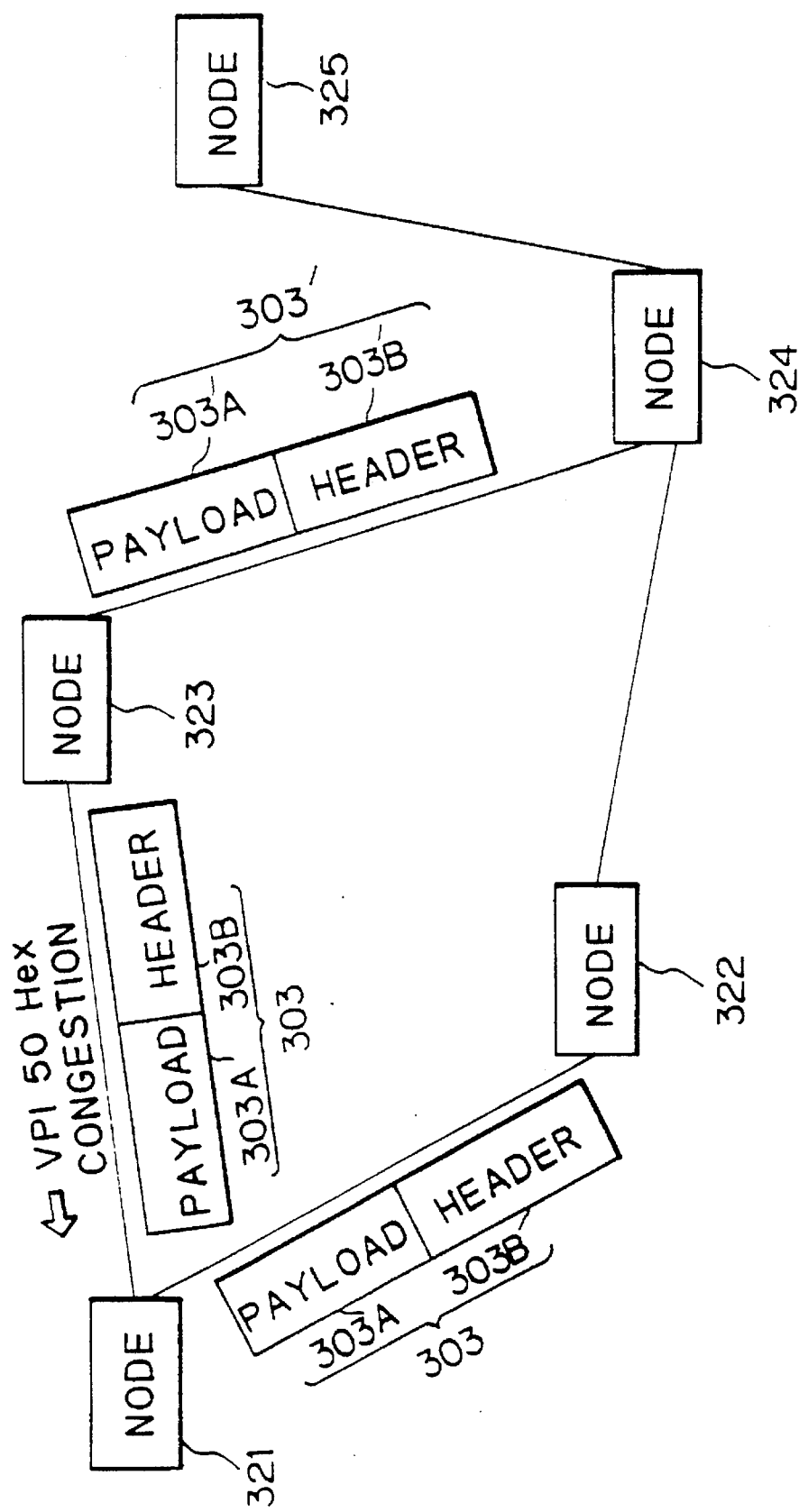
FIG. 27 is an example of a network configuration according to the present invention shown in FIG. 26.

FIG. 26 and 27 are embodiments schematically showing a sixth structure according to the present invention.

In FIG. 26, reference numerals 301 and 302 are communication nodes and the ATM network consists of a plurality of those nodes. One node 301 sends idle cells to the opposed nodes 302 for HEC delineation as described above. A method for supervising and controlling ATM traffic described as follows uses the idle cell having traffic information, which is mapped in the information field of the idle cell, to transfer traffic information to other communication nodes. First, traffic information is mapped in the information field of an idle cell in the transmit node 301, and the idle cell having the traffic information is then transferred to the opposed nodes 302. When receiving the idle cell having traffic information, the opposed node 302 analyzes the traffic information contained in the idle cell and performs the operation of traffic control in accordance with the contents of the traffic information. The node 302 can assemble a new idle cell including the traffic information of received idle cell and/or new traffic information and transfers the new idle cell to other communication nodes.

FIG. 27 is a block diagram schematically showing an example of a network configuration using a sixth embodiment according to the present invention. In FIG. 27, reference numerals 321, 322, 323, 324, 325 are nodes respectively, each node 321–325 is an ATM exchange. In this example, an ATM network consists of plural nodes 321–325. For example, idle cells 303 are sent from a node 321 to two opposed nodes 322, 323 so as to allow identification of a cell boundaries by using HEC delineation, and further the idle cells 303 inform the opposed nodes 322, 323 of traffic information (303A). Likewise, the node 323 sends an idle cell 303' having traffic information 303'A to opposed node 324.

Figure 28:
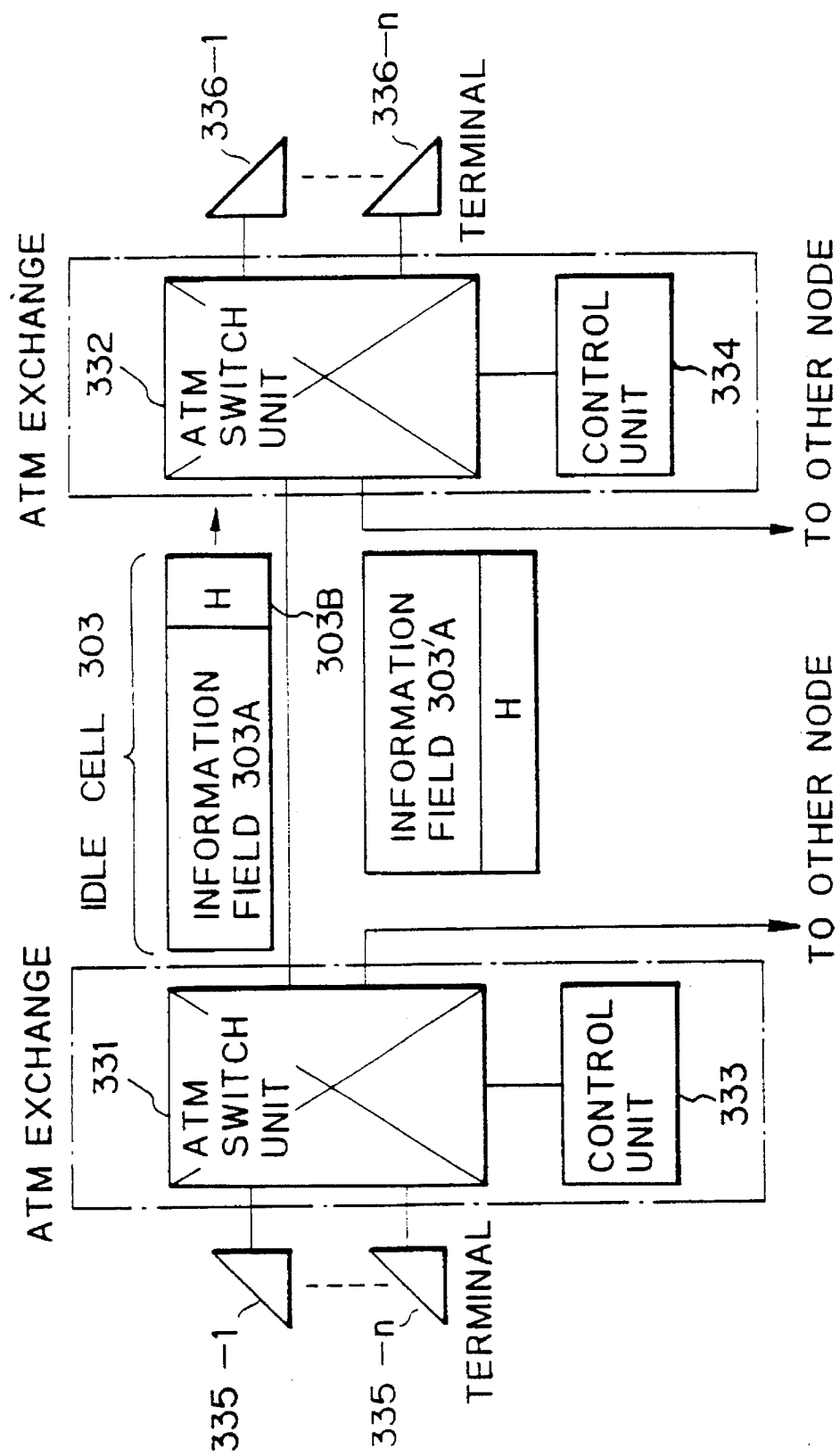
FIG. 28 is a concrete embodiment showing basic parts of the present invention shown in FIG. 26.

FIG. 28 is a block diagram of an embodiment showing main parts of the present invention. In FIG. 28, reference numerals 331, 332 are ATM switch units and reference numerals 333, 334 are control units. The control unit 333 controls the ATM switch unit 331 and the control unit 334 controls the ATM switch unit 332. An ATM exchange (a node) consists of the ATM switch unit and the control unit and having a construction for producing and detecting an idle cell. Terminals 335-1–335-n are connected with the ATM switch units 331 and terminals 336-1–336-n are connected with the ATM switch units 332. In a case of informing partial or total network of e.g., the condition of a transmission-line or traffic information, etc., the control unit 333 provides mapped parameters of needed information to the ATM switch unit 331. The ATM switch unit 331 maps out the parameters of traffic information in an information field 303A of an idle cell 303 and then sends out the idle cell. In contrast to this, in the case that the ATM switch unit 332 receives the idle cell 303 described above, the ATM switch unit 332 temporally stores the information field 303A of the idle cell 303 and then provides the information field 303A of the idle cell 303 to the control unit 334. The control unit 334 investigates the contents of the information field 303A of the idle cell 303, and thereby recognizes the network conditions. In accordance with the network conditions, the control unit 334 controls the ATM switch unit 332, and thereby the ATM switch unit 332 starts or stops the traffic control operation. Further, the ATM switch unit 332 may map the received traffic information to an information field 303'A of a new idle cell 303' and send the new idle cell 303' to other opposed nodes.

Figure 29:
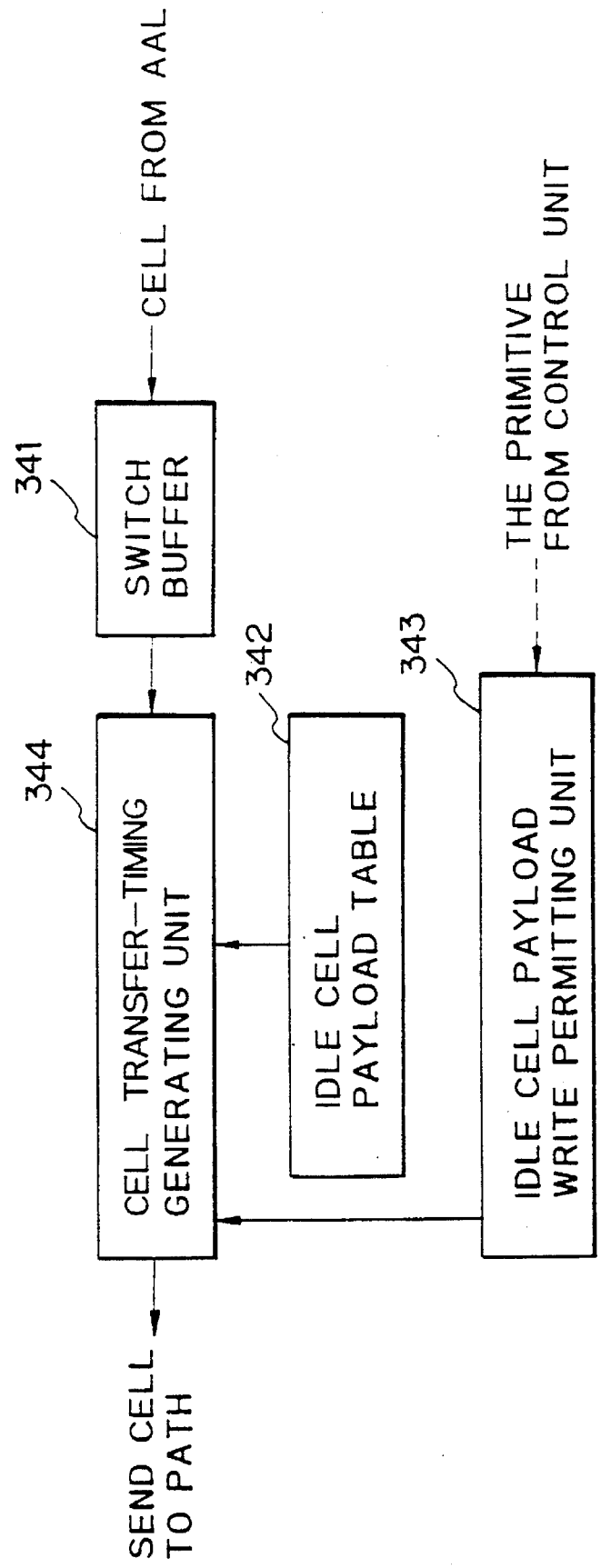
FIG. 29 is an example of a block diagram of a cell transmitting unit in the ATM layer.

FIG. 29 is an example of a block diagram of a cell transmitting unit in an ATM layer. In FIG. 29, reference numeral 341 is a switch buffer functioning as a buffer for a cell provided from AAL (ATM adaptation layer). Reference numeral 342 is an idle cell payload table functioning as data base, through which significant data is provided to an information field (payload) of an idle cell. Reference numeral 343 is an idle cell payload write permitting unit for permitting significant data on the idle cell payload table 342 to be written on a payload of an idle cell by accepting the primitive "beginning of information transfer" from a control unit. Reference numeral 344 is a cell transfer-timing generating unit. The cell transfer-timing generating unit 344 adds significant data based on data of the idle cell payload table 342 to a payload of an idle cell when receiving a write permitting signal from the idle cell payload write permitting unit 343, and then sends the idle cell to a predetermined path.

Namely, if one virtual path (VP) is congested, and thereby causing cell loss on the VP, the control unit provides the primitive "beginning of information transfer" to an ATM layer, which causes the idle cell payload write permitting unit 343 to permit writing data on a payload of an idle cell. Next, the ATM layer that accepted the primitive adds the significant data based on data of the idle cell payload table 342 to a payload of an idle cell, and transfers the idle cell to a path over the cell transfer-timing generating unit 344.

Figure 30:
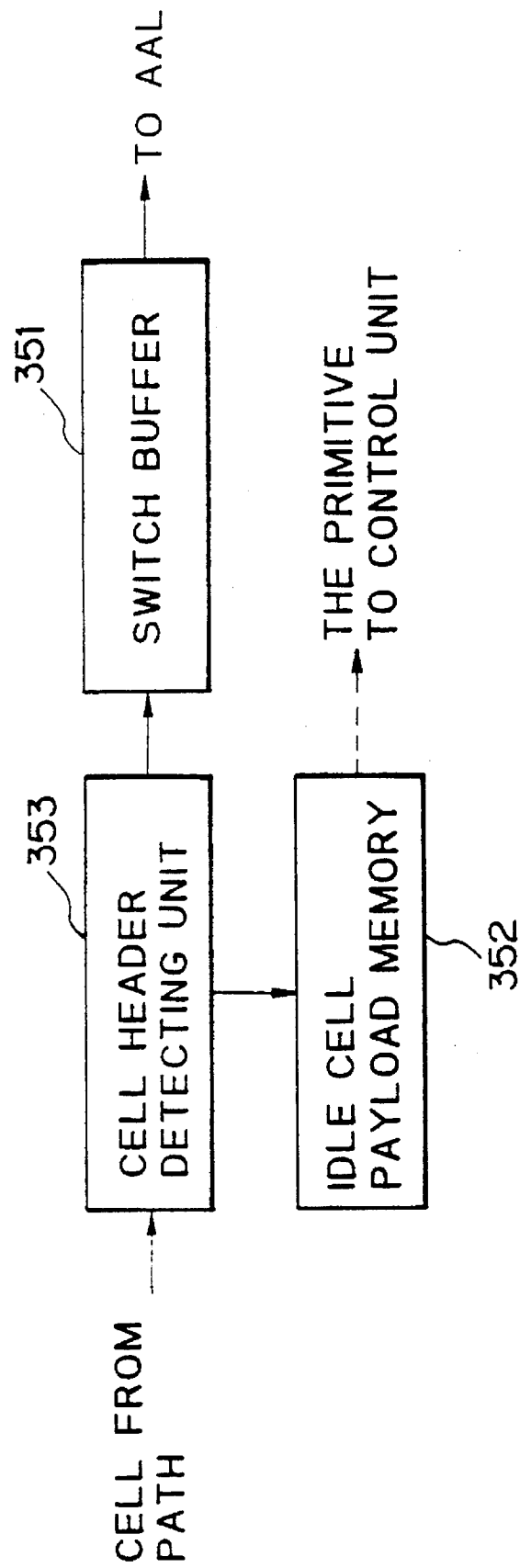
FIG. 30 is an example of a block diagram of a cell receiving unit in the ATM layer.

FIG. 30 is an example of a block diagram of a cell receiving unit in an ATM layer. In FIG. 30, reference numeral 351 is a switch buffer functioning as a buffer for a cell provided through a path. Reference numeral 352 is an idle cell payload memory for storing a payload of an idle cell. Reference numeral 353 is a cell header detecting unit for identifying an idle cell by the header of the idle cell when receiving the idle cell.

Namely, when receiving a cell, the cell header detecting unit 353 identifies the idle cell by the cell header. If identifying the idle cell, the cell header detecting unit 353 stores the payload of the idle cell into the idle cell payload memory 352. Next, a control unit accepting a primitive regarding the operation described above investigates the idle cell payload memory 352. If there is information in the idle cell payload memory 352, the control unit analyzes the information. A node receives the analytic information, e.g., "VPI: 0×50 or 50Hex, congestion", from the control unit and then starts a traffic control operation. The contents of an idle cell payload table 342 on the transmitting side as described above may be copied from the contents of the idle cell payload memory 352 so as to re-transfer the idle cell to opposed nodes.

FIG. 31 shows an example of payload mapping of an idle cell. In this example, a destination node identifier includes the destination node identifier being designated as an individual node and the destination node identifier being designated as a group of destination nodes. A correspondent VPI/VCI field contains the value of VPI/VCI in the condition of, e.g., congestion, quasi-congestion, etc. A phenomenon code field contains code numbers corresponding to, e.g., congestion, quasi-congestion, over-congestion, etc. An adaptation code field contains the code number corresponding to, e.g., start or stop of cell discard (broadcast), start or stop of cell discard (selective), start or stop of interruption of call reception, start or stop of a limitation of call reception, and omission of information, etc.

Figure 32:
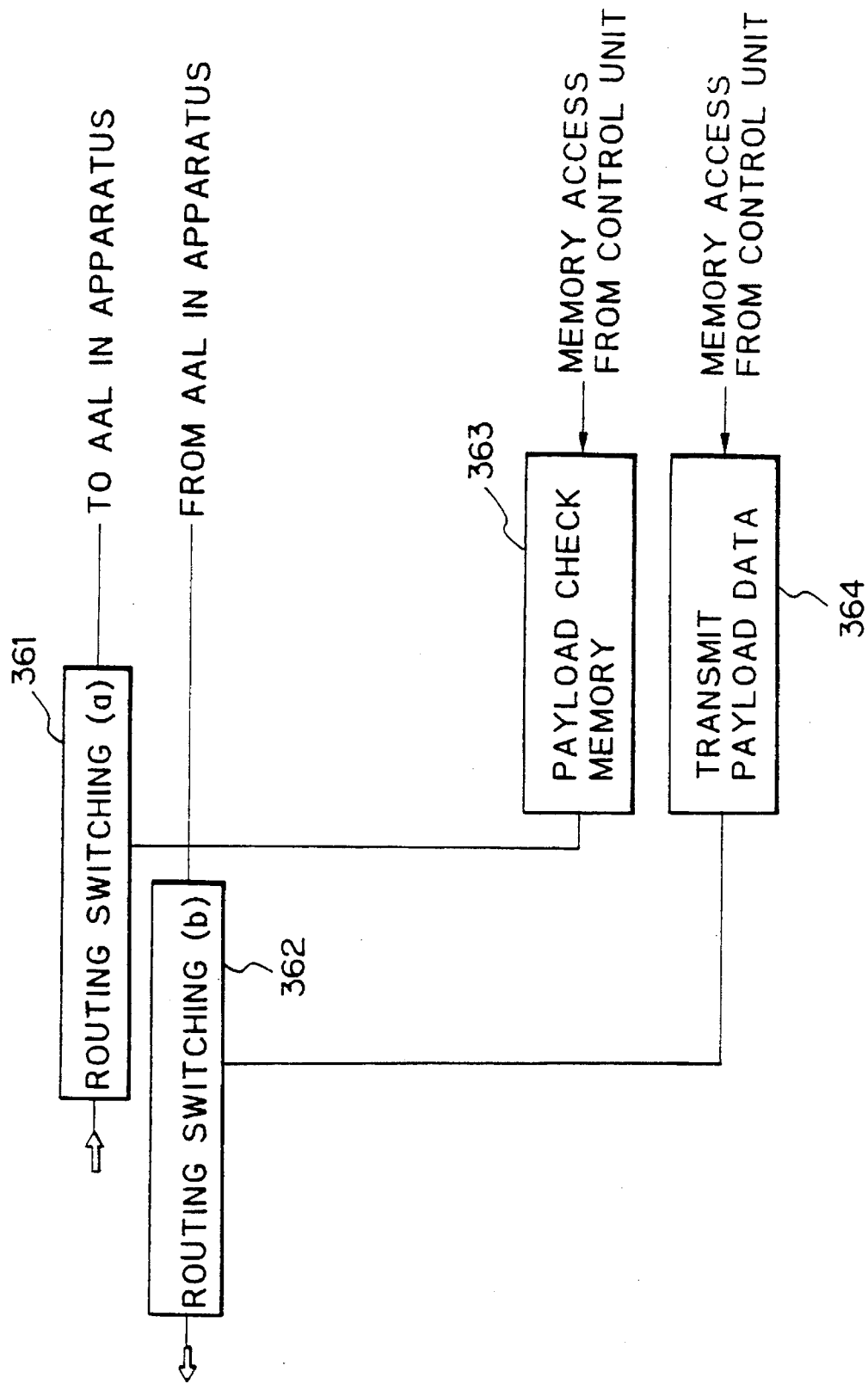
FIG. 32 is a block diagram showing the idle cell catching portion in the ATM switch.

FIG. 32 is a block diagram showing an idle cell catching portion in an ATM switch, and concretely, designates a cross connect unit in an ATM switch unit. (real node has a plurality of units (shown in FIG. 32) corresponding to the number of paths. The contents of a payload of all idle cells provided from a line interface unit is written on a payload check memory 363 through a routing switching unit (a) 361. A control unit reads out an one cell data (one cell; 48 byte) from the payload check memory 363. If the read data is all zero, the control unit discards the data. Conversely, if not zero, the control unit provides the data to a management and maintenance unit. The management and maintenance unit analyzes the accepted data. If a destination node identifier described above designates its own address, the management and maintenance unit performs the operation according to a correspondent VPI/VCI, a phenomenon code and an adaptation code shown in FIG. 31. If designating another node address, the management and maintenance unit copies the accepted data to a transmit payload data memory 364, and at this time the management and maintenance unit may add new traffic data to the accepted data. The data written on the transmit payload data memory 364 is transferred to the other node through a routing switch (b) 362.

Figure 33:
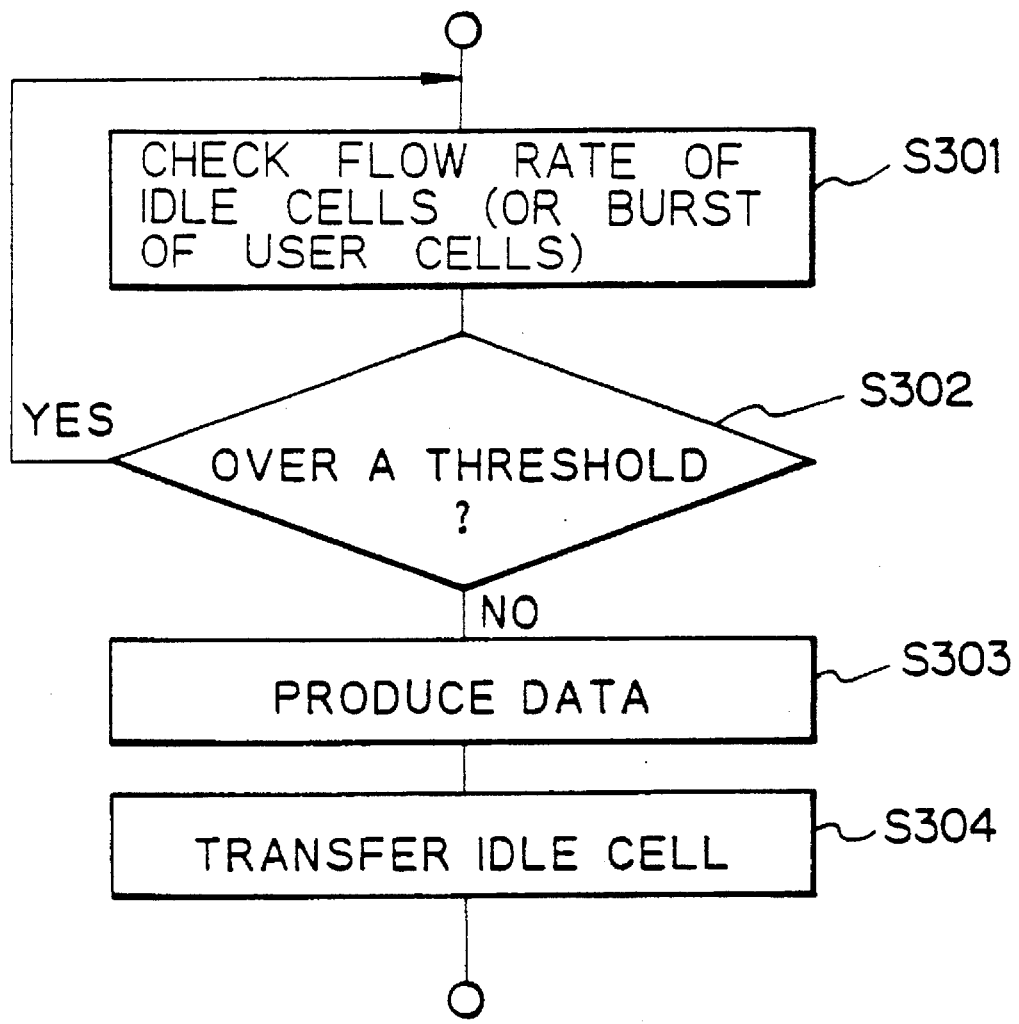
FIG. 33 is an example of flow processing that assembles an idle cell by a control unit.

FIG. 33 shows an example of flow processing that assembles an idle cell by a control unit. In FIG. 33, the control unit ordinary monitors the flow rate of an idle cell or burst condition of a user information cell in step S301. In the case of monitoring the flow rate of an idle cell, if the flow rate of an idle cell is under a predetermined threshold value (NO in step S302), which indicates an excess of user information cells, and idle cells having traffic information are produced in step S303, and transferred to other communication nodes to inform them of such a traffic condition (S304).

As described above, the total network operation of the present invention is as follows.

In FIG. 27, for example, assuming that a node 321 is in a condition of congestion and cell loss is caused at one VP, the node 321 sends traffic information to opposed nodes 322, 323, using an idle cell 303 for the HEC delineation. Namely, a control unit of the node 321 provides the primitive "beginning of information transfer" to an ATM layer, and thereby causes an idle cell payload write permitting unit 343 to permit writing data on a payload of an idle cell. Next, the ATM layer that accepted the primitive adds the significant data based on data of the idle cell payload table 342 to a payload 303A of an idle cell 303, and sends the idle cell 303 to paths connected with the nodes 322, 323 through a cell transfer-timing generating unit 344. On the other side, when each ATM layer of the nodes 322, 323 receives the idle cell 303, a cell header detecting unit 353 identifies the idle cell 303 by the cell header 303B and stores the payload 303A into an idle cell payload memory 352. Next, a control unit accepting a primitive related to the storage operation described above investigates the idle cell payload memory 352. If there is information on the idle cell payload memory 352, the control unit analyzes the information. A node receives the analytic information, e.g., "VPI: 0×50 or 50Hex, congestion", from the control unit and then starts a traffic control operation. Also, in each node 322, 323, contents of an idle cell payload table 342 on the transmitting side is copied from the contents of the idle cell payload memory 352, and as described above traffic information is sent to the other node 324 by using an idle cell 303' for the HEC delineation.

As described above, according to the present invention, by using an idle cell rate or a burst count of user information cells according to the present invention, information related to a fluctuation of traffic condition, including burst conditions, can be briefly and easily collected, and further the traffic conditions can be rapidly and timely controlled.

Further, by using an administrative cell according to the present invention, transmission of traffic information can be transferred without an influence on the transmission of network control signals.

Furthermore, by using idle cells according to the present invention, a transmission delay of traffic information is prevented by decreasing the load of a switch buffer in a transit node. Further, a kind of cell is decreased since it does not use a specific cell for transmission of traffic information, and a distinction between traffic information and other information becomes easy. Furthermore, by using idle cells that are used in an existent ATM network, a method of the present invention can be easily applicable to a total ATM network.

We claim:

1. A method for supervising and controlling ATM traffic among ATM nodes in a network, comprising a step of mapping traffic information into an idle cell, the traffic information being mapped into the information field of said idle cell, to generate a traffic information cell to transfer traffic information to other communication nodes.

2. A method for supervising and controlling ATM traffic among ATM nodes in a network, as set forth in claim 1 wherein said traffic information cell having traffic information is distinguished from a conventional idle cell having no traffic information by checking for existence of data mapped in the information field of cells.

3. A method for supervising and controlling ATM traffic among ATM nodes in a network as set forth in claim 1 wherein said traffic information cell having traffic information is transferred to an individual destination node.

4. A method for supervising and controlling ATM traffic among ATM nodes in a network as set forth in claim 1 wherein said traffic information cell having traffic information is transferred to a group of destination nodes.

5. A method for supervising and controlling ATM traffic among ATM nodes in a network, which uses idle cells each having an information field for transferring traffic information to manage a network, comprising the steps of:

a first step for mapping traffic information in the information field of an idle cell to generate a traffic information cell and transferring said traffic information cell to other communication nodes; and a second step for performing the operation of traffic control in accordance with the contents of said traffic information included in said traffic information cell on the receiving side of said other communication nodes.

6. A method for supervising and controlling ATM traffic among ATM nodes in a network, which uses idle cells each having an information field for transferring traffic information to manage a network, comprising the steps of;

a first step for mapping traffic information in the information field of an idle cell to generate a traffic information cell and transferring said traffic information cell to other communication nodes;

a second step for performing the operation of traffic control in accordance with the contents of said traffic information included in said traffic information cell on the receiving side of said other communication nodes; and a third step for assembling a new traffic information cell including said traffic information of received traffic information cell and/or new traffic information on said receiving side of communication nodes and transferring said new traffic information cell from said receiving side of communication nodes to other communication nodes.

* * * * *

UNITED STATES PATENT AND TRADEMARK OFFICE
CERTIFICATE OF CORRECTION

PATENT NO. : 5,570,361

DATED : October 29, 1996

INVENTOR(S) : Reiko NORIZUKI, et al.

It is certified that error appears in the above-identified patent and that said Letters Patent is hereby corrected as shown below:

Col. 1, line 39, change "multi-mediam" to --multi-medium--;
line 46, change ",unit)" to --Unit)--.

Col. 2, line 12, change "FIG." to --FIGS.--;
lines 34 and 35, change "CIP" to --CLP--.

Col. 3, line 24, change "significant-in" to --significant in--.

Col. 4, line 60, change "mapped," to --mapped--.

Col. 5, line 34, change "FIG." to --FIGS.--;
line 50, before "the" insert --to--.

Col. 9, line 48, change "FIG." to --FIGS.--.

Col. 10, line 49, delete "is";
line 60, change "FIG." to --FIGS.--.

UNITED STATES PATENT AND TRADEMARK OFFICE
CERTIFICATE OF CORRECTION

PATENT NO. : 5,570,361

DATED : October 29, 1996

INVENTOR(S) : Reiko NORIZUKI, et al.

It is certified that error appears in the above-identified patent and that said Letters Patent is hereby corrected as shown below:

Col. 11, lines 22 and 25, change "AA1" to --AAL--.

Col. 12, line 11, change "FIG." to --FIGS.--.

Col. 14, line 49, change "FIG." to --FIGS.--.

Col. 16, line 45, change "unit.(real" to --unit. Real--.

Col. 17, line 24, change "On" to --On--.

Signed and Sealed this

Eighteenth Day of March, 1997

*Attest:*

BRUCE LEHMAN

*Attesting Officer*   Commissioner of Patents and Trademarks